US012575910B2

(12) United States Patent
Joo

(10) Patent No.: US 12,575,910 B2
(45) Date of Patent: Mar. 17, 2026

(54) METHOD AND APPARATUS FOR RECOMMENDING ORTHODONTIC TREATMENT PLAN BY SEPARATING TOOTH OBJECT FROM THREE-DIMENSIONAL ORAL SCAN DATA AND AUTOMATICALLY DETERMINING POSITIONAL ABNORMALITY OF TOOTH, AND COMPUTER-READABLE RECORDING MEDIUM

(71) Applicant: INNODTECH, Inc., Gwangju (KR)

(72) Inventor: Bo Hoon Joo, Seoul (KR)

(73) Assignee: INNODTECH, INC., Gwangju (KR)

( * ) Notice: Subject to any disclaimer, the term of this patent is extended or adjusted under 35 U.S.C. 154(b) by 27 days.

(21) Appl. No.: 18/294,294

(22) PCT Filed: Aug. 10, 2022

(86) PCT No.: PCT/KR2022/011898
§ 371 (c)(1),
(2) Date: Feb. 1, 2024

(87) PCT Pub. No.: WO2023/018206
PCT Pub. Date: Feb. 16, 2023

(65) Prior Publication Data
US 2025/0127591 A1 Apr. 24, 2025

(30) Foreign Application Priority Data

| Aug. 10, 2021 | (KR) | ........................ 10-2021-0105225 |
| Aug. 24, 2021 | (KR) | ........................ 10-2021-0111658 |
| Oct. 12, 2021 | (KR) | ........................ 10-2021-0135047 |

(51) Int. Cl.
| *A61C 7/00* | (2006.01) |
| *A61C 19/04* | (2006.01) |
| *G06T 7/00* | (2017.01) |

(52) U.S. Cl.
CPC .............. *A61C 7/002* (2013.01); *A61C 19/04* (2013.01); *G06T 7/0012* (2013.01); *A61C 2007/004* (2013.01); *G06T 2207/30036* (2013.01)

(58) Field of Classification Search
CPC ... A61C 7/002; A61C 19/04; A61C 2007/004; A61C 7/00; A61C 13/34; G06T 7/0012;
(Continued)

(56) References Cited

U.S. PATENT DOCUMENTS

| 9,235,901 B2 * | 1/2016 | Yan | .......................... G06T 7/155 |
| 11,883,249 B2 * | 1/2024 | Kim | ..................... A61C 9/0046 |
(Continued)

FOREIGN PATENT DOCUMENTS

| KR | 10-2011-0040736 | 4/2011 |
| KR | 10-1218389 | 1/2013 |
(Continued)

OTHER PUBLICATIONS

"Office Action for Korea Patent Application No. 10-2021-0111658, mailed Jun. 20, 2023."
(Continued)

*Primary Examiner* — Vijay Shankar

(57) ABSTRACT

The method for recommending an orthodontic treatment plan by analyzing three-dimensional oral scan data comprises: increasing a size of a circle from the center of coordinates of the three-dimensional oral scan data; reversing a vector direction of a mesh, duplicating spheres while moving the spheres at a random speed in a peripheral direction from reference coordinates, and arranging the spheres inside the teeth; determining a representative sphere corresponding to each tooth, and extracting feature data of the teeth on the basis of a contact point and coordinates of the representative sphere; implementing the examinee's
(Continued)

tooth arrangement using feature data extracted for each tooth and axis data for each tooth; applying a relative arrangement state of tooth objects included in tooth arrangement data to an automatic diagnosis algorithm; and combining classification results for the positional abnormality of the teeth to generate oral state information about the examinee before the treatment.

16 Claims, 12 Drawing Sheets

(58) Field of Classification Search
CPC . G06T 2207/30036; G06T 2207/10028; G06T 2207/20084; G06T 7/00; G06N 20/00; G06N 3/04; G06N 3/08; G16H 50/50; G16H 50/20; G16H 50/70
See application file for complete search history.

(56) References Cited

U.S. PATENT DOCUMENTS

2011/0085715 A1 * 4/2011 Yan ........................... G06T 7/11
382/128

2012/0287129 A1 * 11/2012 Storti ...................... G06T 17/10
345/424
2021/0205057 A1 * 7/2021 Kim .......................... G06T 7/10

FOREIGN PATENT DOCUMENTS

| | | |
|---|---|---|
| KR | 10-2056480 | 1/2020 |
| KR | 10-2132369 | 7/2020 |
| KR | 10-2234426 | 3/2021 |
| KR | 10-2273438 | 7/2021 |

OTHER PUBLICATIONS

"Office Action for Korea Patent Application No. 10-2021-0105225, mailed Sep. 20, 2022."

"PCT International Search Report and Written Opinion for International Application No. PCT/KR2022/011898, Date of Mailing: Nov. 15, 2022".

* cited by examiner

[FIG. 1]
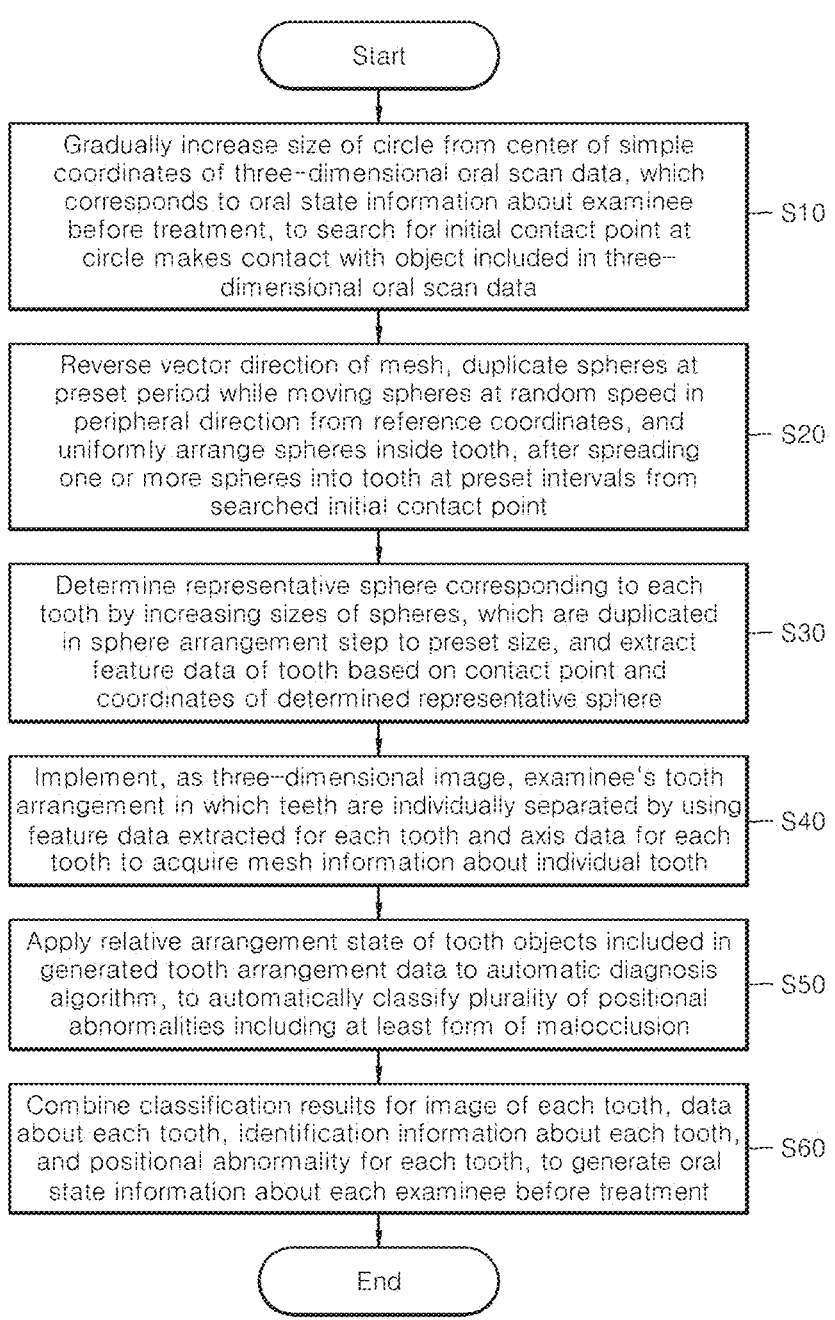

【FIG. 2】
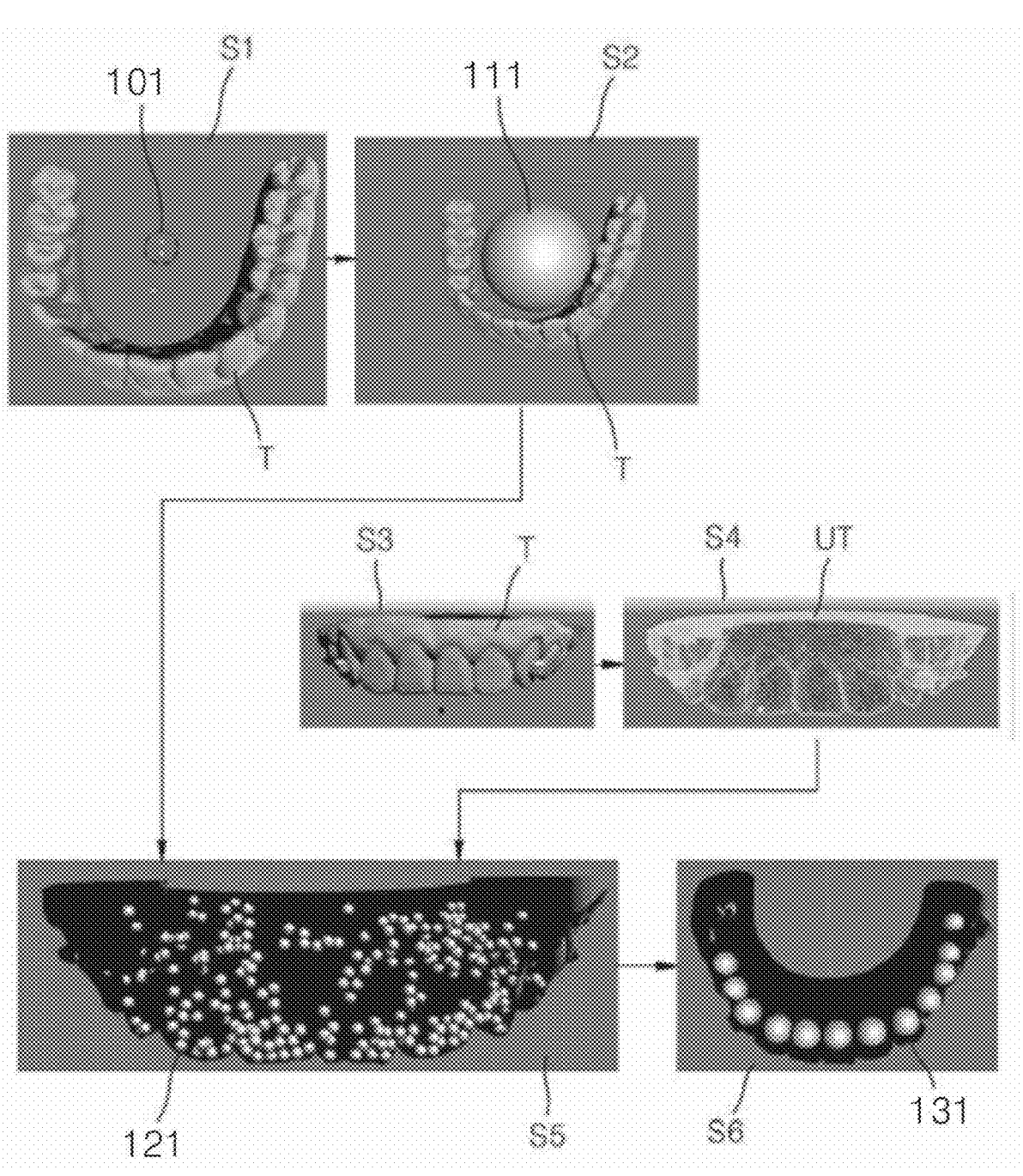

| ▽ 人  Transform | | | | | ⑦ ⇄ ⋮ |
|---|---|---|---|---|---|
| Position | X | −27.28733 | Y | −0.756659 | Z | 21.93321 |
| Rotation | X | 46.722 | Y | 135.45 | Z | −11.478 |
| Scale | X | 5 | Y | 5 | Z | 5 |

| ▽ 人  Transform | | | | | ⑦ ⇄ ⋮ |
|---|---|---|---|---|---|
| Position | X | −25.25846 | Y | 1.72447 | Z | 10.34976 |
| Rotation | X | −155.173 | Y | 28.778 | Z | 17.38199 |
| Scale | X | 5 | Y | 5 | Z | 5 |

| ▽ 人  Transform | | | | | ⑦ ⇄ ⋮ |
|---|---|---|---|---|---|
| Position | X | −21.63188 | Y | 3.225379 | Z | 0.5026065 |
| Rotation | X | −5.206 | Y | −157.776 | Z | 72.107 |
| Scale | X | 5 | Y | 5 | Z | 5 |

| ▽ 人  Transform | | | | | ⑦ ⇄ ⋮ |
|---|---|---|---|---|---|
| Position | X | −18.05902 | Y | 3.84535 | Z | −6.395124 |
| Rotation | X | 127.387 | Y | 113.881 | Z | 18.10199 |
| Scale | X | 5 | Y | 5 | Z | 5 |

| ▽ 人  Transform | | | | | ⑦ ⇄ ⋮ |
|---|---|---|---|---|---|
| Position | X | −13.98125 | Y | 5.528561 | Z | −12.60206 |
| Rotation | X | −6.588 | Y | −113.524 | Z | 27.748 |
| Scale | X | 5 | Y | 5 | Z | 5 |

| ▽ 人  Transform | | | | | ⑦ ⇄ ⋮ |
|---|---|---|---|---|---|
| Position | X | −7.924135 | Y | 6.095528 | Z | −16.06496 |
| Rotation | X | 11.516 | Y | −7.209 | Z | −110.581 |
| Scale | X | 5 | Y | 5 | Z | 5 |

| ▽ 人  Transform | | | | | ⑦ ⇄ ⋮ |
|---|---|---|---|---|---|
| Position | X | −2.863041 | Y | 6.905374 | Z | −17.46809 |
| Rotation | X | 68.108 | Y | −89.939 | Z | 3.618 |
| Scale | X | 5 | Y | 5 | Z | 5 |

【FIG. 4】
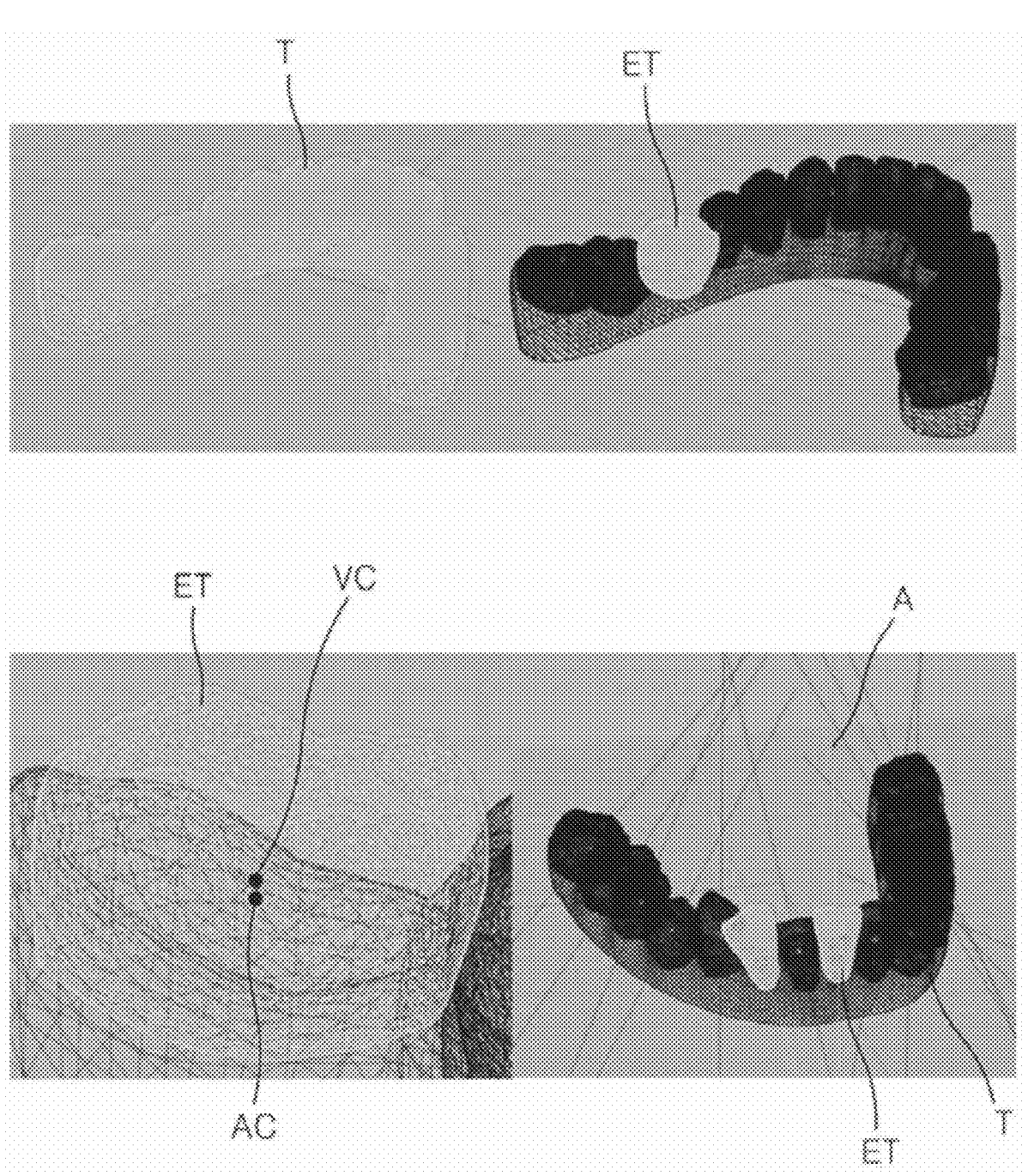

[FIG. 5]
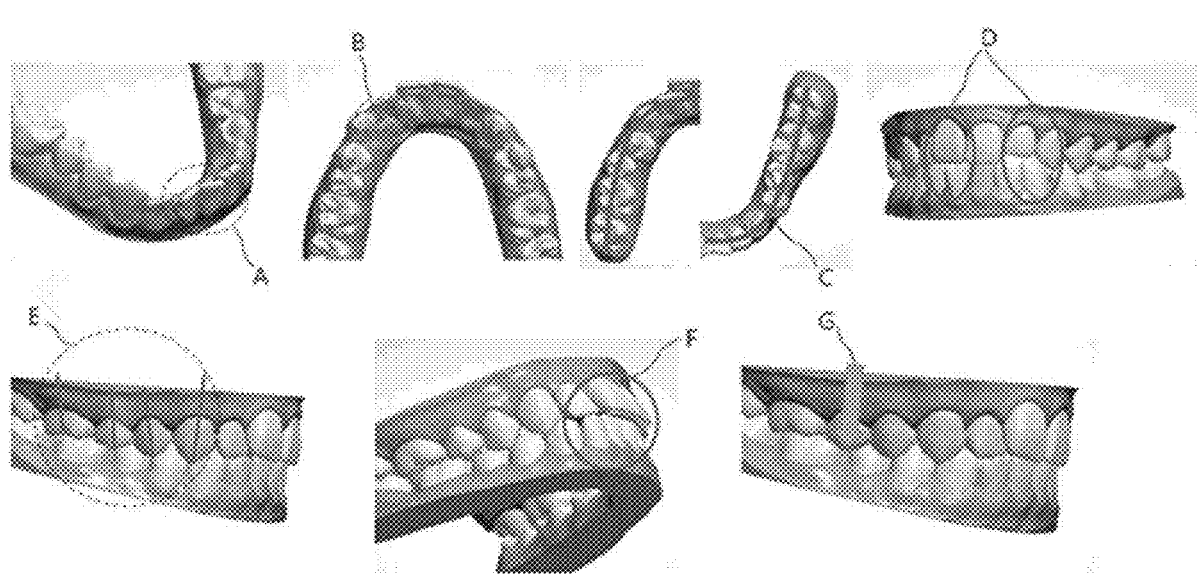

[FIG. 6]
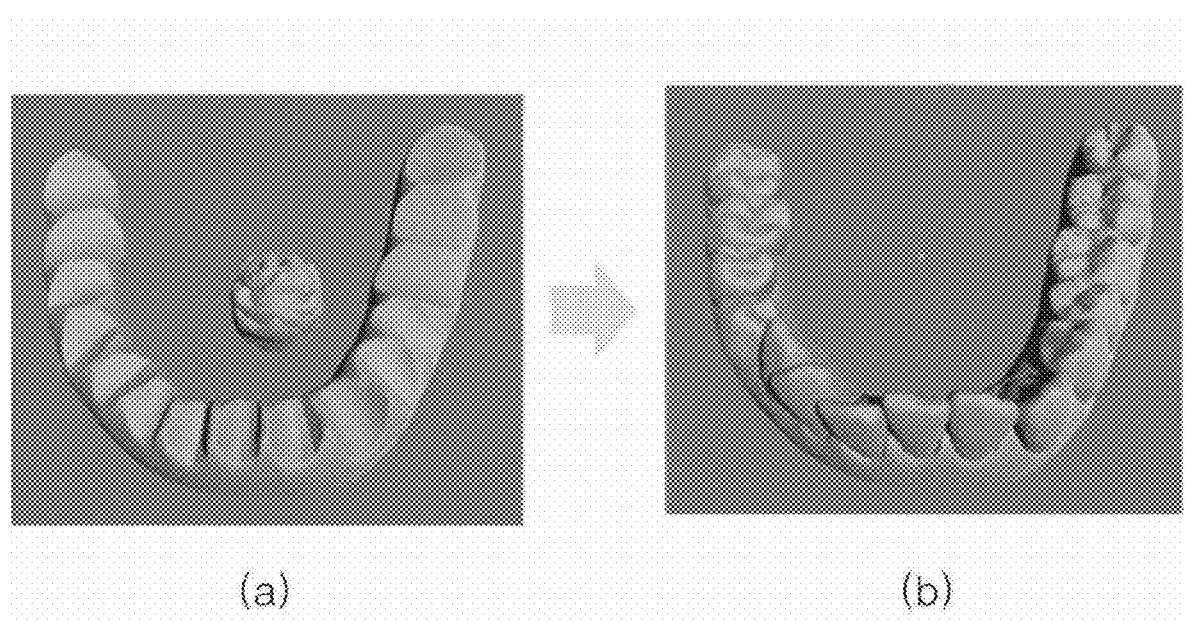
(a)                                     (b)

【FIG. 7】
(a)
(b)
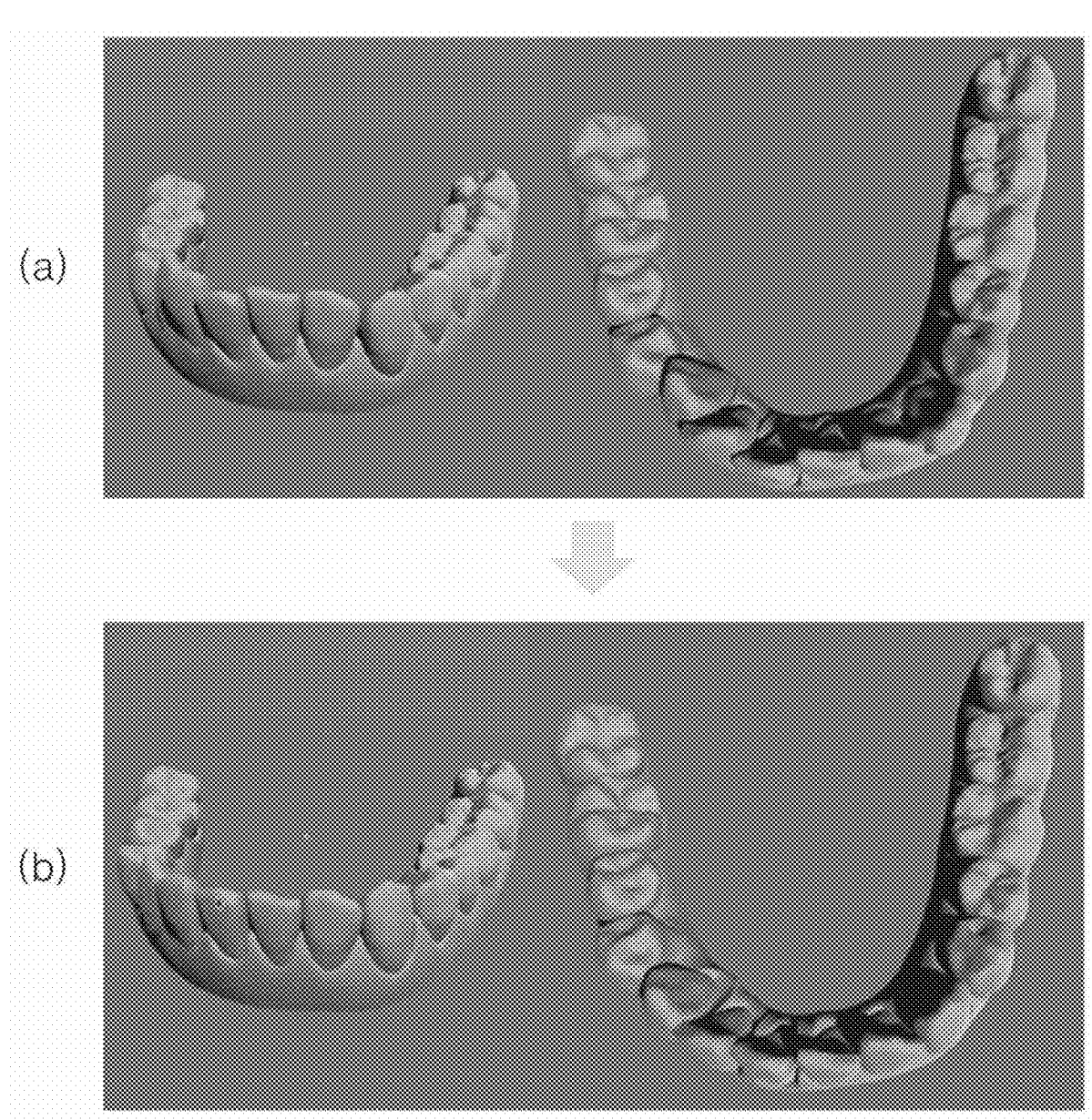

Before Array

Target Array

Solution Label

1.4, 1.3, 1.2, 1.1,
2.1, 2.2, 2.3, 2.4
Pressure
0.3, 0.3, 0.4, 0.4,
0.3, 0.2, 0.3, 0.2

| | at1 | at2 | ... | atN | at1' | at2' | ... | atN' | at1" | at2" | ... | atM" |
|---|---|---|---|---|---|---|---|---|---|---|---|---|
| ins1 | Before Array | | | | Target Array | | | | Solution Label | | | |
| ins2 | Before Array | | | | Target Array | | | | Solution Label | | | |
| ... | Before Array | | | | Target Array | | | | Solution Label | | | |
| insN | Before Array | | | | Target Array | | | | Solution Label | | | |

[FIG. 9]
400
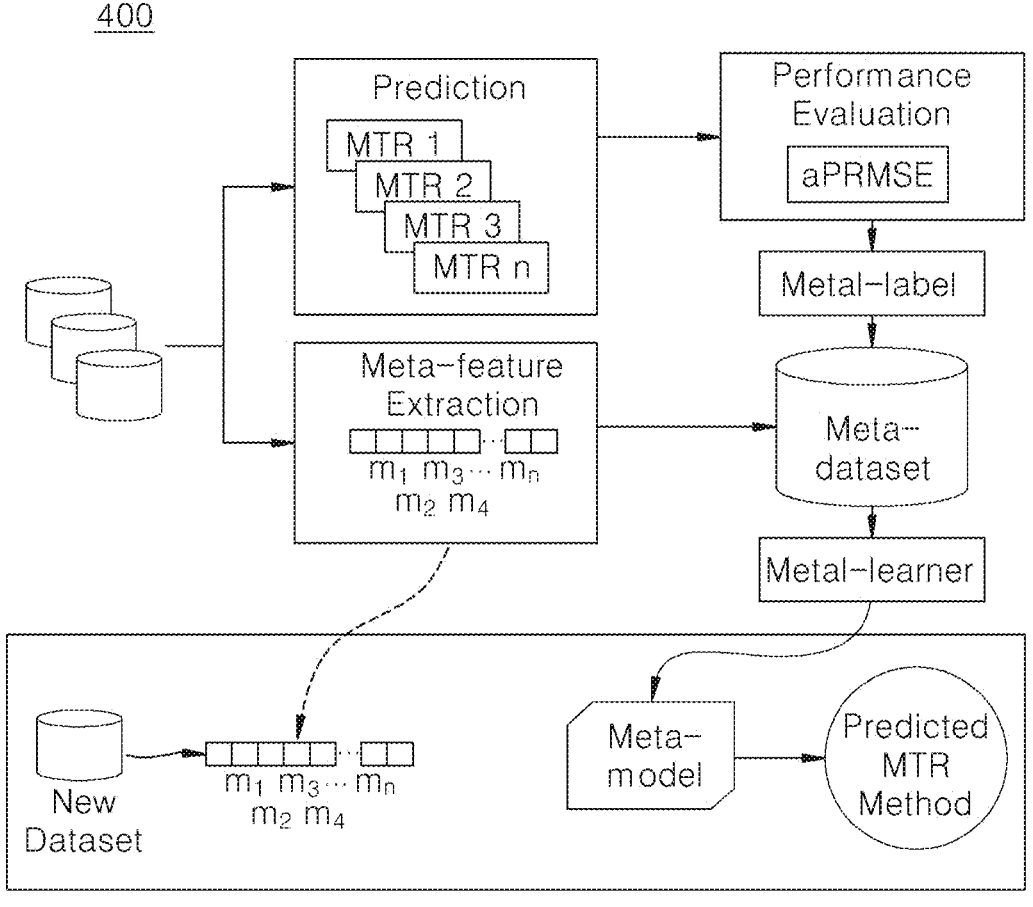

【FIG. 10】
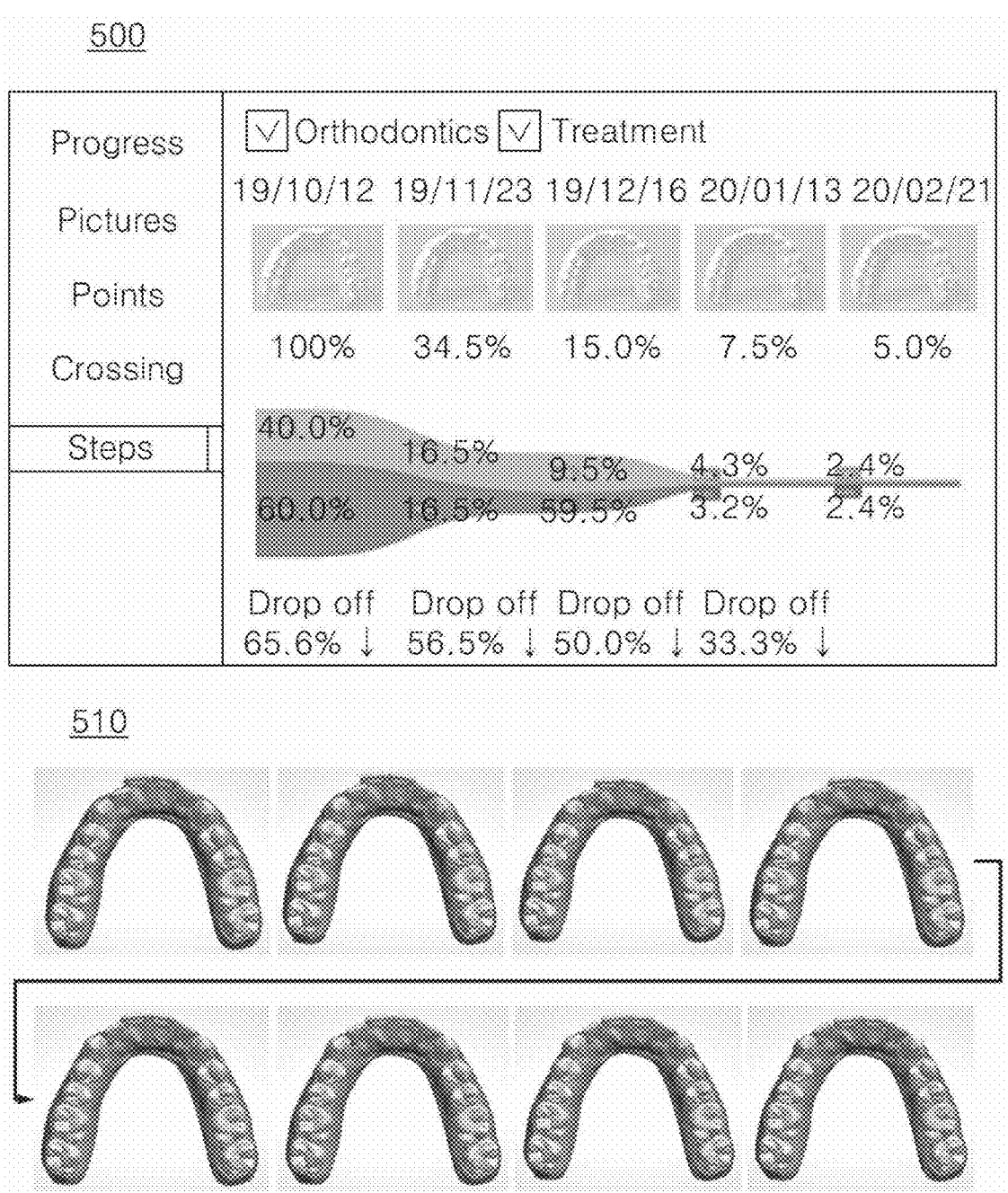

【FIG. 11】
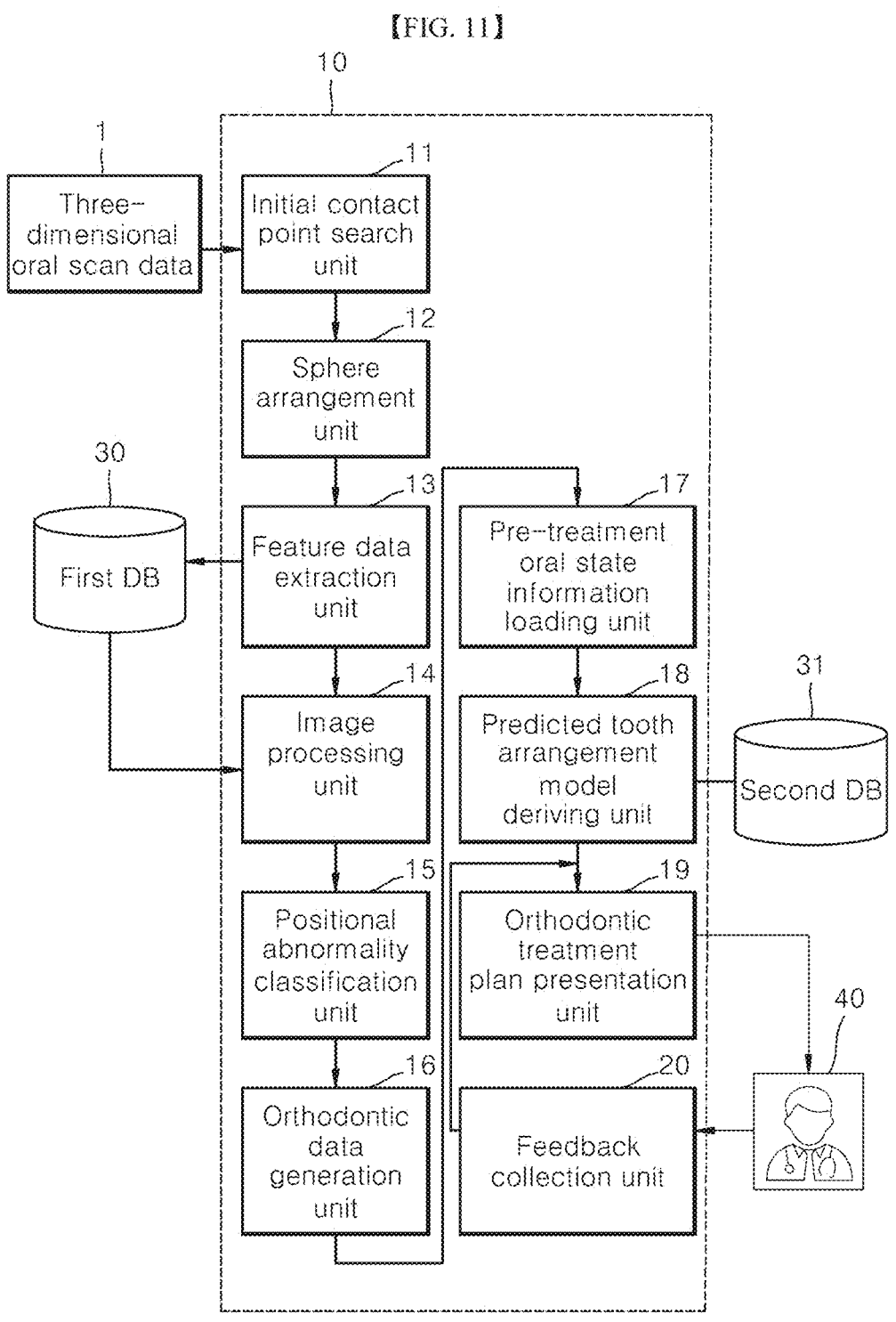

【FIG. 12】
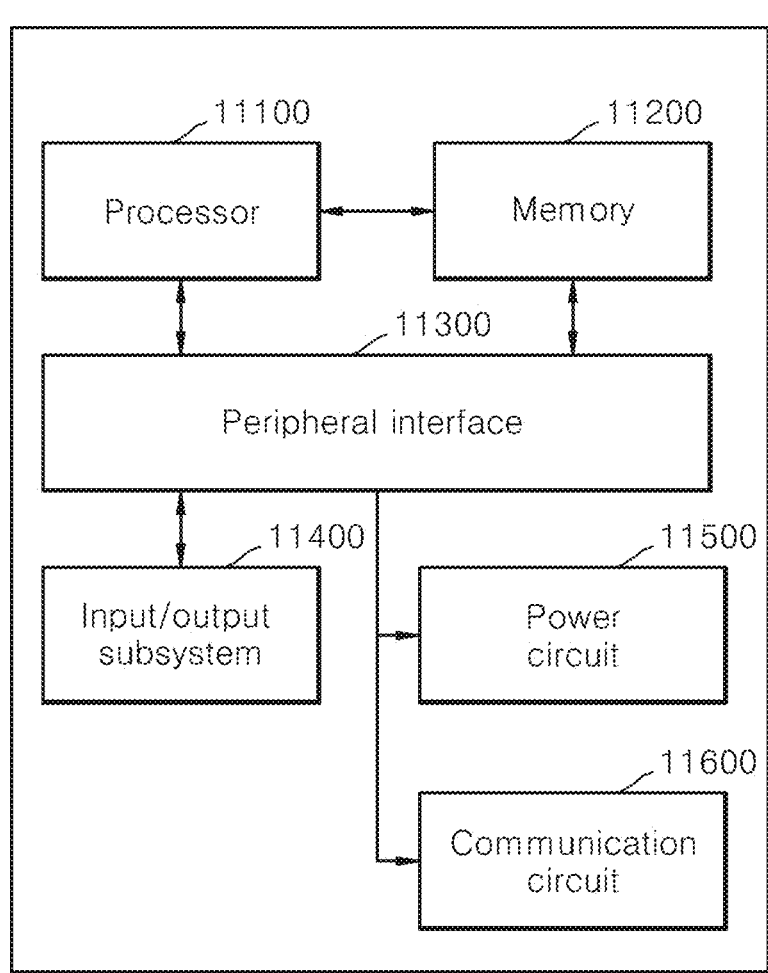

METHOD AND APPARATUS FOR RECOMMENDING ORTHODONTIC TREATMENT PLAN BY SEPARATING TOOTH OBJECT FROM THREE-DIMENSIONAL ORAL SCAN DATA AND AUTOMATICALLY DETERMINING POSITIONAL ABNORMALITY OF TOOTH, AND COMPUTER-READABLE RECORDING MEDIUM

TECHNICAL FIELD

The present invention relates to a method for recommending an orthodontic treatment plan by separating a tooth object from a three-dimensional oral scan data and automatically determining a positional abnormality of a tooth, and more specifically, to a technology of providing recommendation of an orthodontic treatment plan that reflects characteristics of an individual tooth of an examinee by separating a tooth object from a three-dimensional oral scan data about the examinee based on a contact point and a feature point of the individual tooth, and automatically determining a position abnormality of each tooth required to establish the orthodontic treatment plan by using axis relationship together with accurate relative coordinates and direction values for each tooth, thereby selecting an optimal tooth arrangement structure.

BACKGROUND ART

In general, in the field of orthodontic treatment, various attempts have been made to extract meaningful data for orthodontics using an image processing technology and use the data for orthodontic treatment.

However, in the method for using image processing in the orthodontic treatment field, an application field thereof is limited to the extent that the dentist uses the three-dimensional oral scan data about an examinee, and as a result, accurate orthodontic treatment is possible only when the dentist obtains know-how through several years of training, and for this reason, there is a problem in that deviation of the orthodontic results is large even for patients of the same case depending on the dentist.

Meanwhile, in an effort to reduce the deviation of the orthodontic results, referring to the related art such as Korean Unexamined Patent Publication No. 2016-0004862, the related art suggests a technology of performing tooth modeling based on three-dimensional tooth part scan data and reflecting results of examination and diagnosis by a doctor to perform a simulation procedure during orthodontic treatment.

However, such a technology in the related art is merely a degree of comparing the change before and after the orthodontic treatment by using diagnostic data of a dentist alone or diagnostic data dependent on a simple experience as attribute data for deriving the orthodontic results, and thus there is a limitation in that it is not possible to substantially reduce the deviation of the orthodontic results according to a dentist or a dental clinic, and in order to solve the above-described problem, there is a situation in which the necessity of an algorithm for deriving a diagnosis and treatment plan based on a standardized treatment protocol is emphasized.

DISCLOSURE

Technical Problem

Accordingly, a first object of the present invention is to provide a technology for separating a tooth object based on a contact point and a feature point of an individual tooth in three-dimensional oral scan data.

In addition, a second object of the present invention is to provide a technology capable of automatically performing diagnosis, which serves as a treatment basis for treatment in orthodontic dental, based on three-dimensional oral scan data through construction of a model and machine learning, specifically, deep learning of the model by efficiently analyzing tooth data about a patient in the orthodontic dental field to derive results of automatically performing the diagnosis in the orthodontic dental field for each tooth.

In addition, a third object of the present invention is to select an optimal tooth arrangement structure by a preset algorithm based on a tooth state and possibility of movement of an individual tooth, which are confirmed in oral state information of an examinee before treatment, and to provide an algorithm for recommending an orthodontic treatment plan reflecting characteristics of the individual tooth.

Technical Solution

To achieve the above objects, according to one embodiment of the present invention, a method for recommending an orthodontic treatment plan by separating a tooth object from a three-dimensional oral scan data and automatically determining a positional abnormality of a tooth, which is implemented by a computing device including one or more processors and a main memory for storing instructions executable in the processors, includes: an initial contact point search step of gradually increasing a size of a circle from a center of simple coordinates of the three-dimensional oral scan data, which corresponds to oral state information about an examinee before treatment, to search for an initial contact point at which the circle makes contact with an object included in the three-dimensional oral scan data; a sphere arrangement step of, after spreading one or more spheres into the tooth at preset intervals from the searched initial contact point, reversing a vector direction of a mesh, duplicating the spheres at a preset period while moving the spheres at a random speed in a peripheral direction from reference coordinates, and uniformly arranging the spheres inside the tooth; a feature data extraction step of determining a representative sphere corresponding to each tooth by increasing sizes of the spheres, which are duplicated in the sphere arrangement step, to a preset size, and extracting feature data about the tooth based on a contact point and coordinates of the determined representative sphere; an image processing step of implementing, as a three-dimensional image, an examinee's tooth arrangement in which teeth are individually separated by using feature data extracted for each tooth and axis data for each tooth to acquire mesh information about an individual tooth; a positional abnormality classification step of applying a relative arrangement state of tooth objects included in tooth arrangement data, which is generated in the image processing step, to an automatic diagnosis algorithm, to automatically classify a plurality of positional abnormalities including at least a form of malocclusion; and an orthodontic data generation step of combining classification results for an image of each tooth, data about each tooth, identification information about each tooth, and a positional abnormality for each tooth, to generate oral state information about the examinee before treatment, according to a result of performing the positional abnormality classification step.

In this case, it is preferable that in the image processing step, the axis data for each tooth is extracted based on a volume center point and a width center point of the three-dimensional scan data, and axis data for each tooth obtained parallel to a root of the tooth is extracted by applying a numerical correction value, which is derived through statistical analysis, to a line passing through the volume center point and the width center point.

In addition, it is preferable that the determination of the representative sphere is performed until representative spheres corresponding to a number of teeth of the examinee is obtained by determining a representative sphere corresponding to a center point of each tooth by increasing the size of the duplicated sphere to a preset size to remove a sphere that falls outside the tooth, and reducing a sphere remaining inside the tooth to the preset size.

In addition, it is preferable that the image processing step includes converting the mesh information of the individual tooth into a preset file format compatible in a first program that handles motion data to export the mesh information, and storing work data in the first program as a script file.

In addition, it is preferable that the feature data extracting step includes: extracting, as feature data of a representative sphere corresponding to one individual tooth, x, y, and z coordinate values for a position in a three-dimensional space, x, y, and z coordinate values for rotation, and x, y, and z coordinate values for scale.

In addition, it is preferable that when the sphere arrangement step is performed, a size of the spheres spread into the tooth is in a range of 1 to 5 units, in which one unit corresponds to 1/10,000 mm.

In addition, it is preferable that the positional abnormality classification step includes determining, based on the size of the tooth and the relative arrangement state, for each malocclusion as crowding when contact points between the teeth do not meet each other and intersect, spacing when a space exists between the contact points between the teeth, rotation when the teeth are rotated together, openbite & deepbite when a vertical relationship of the teeth does not coincide with a preset first numerical value, tilt of a mesiodistal tooth axis when an inclination of the tilt of the mesiodistal tooth axis of the tooth does not coincide with a preset second numerical value, tilt of buccalingual tooth axis when an inclination of the tilt of buccalingual tooth axis of the tooth does not coincide with a preset third numerical value, and engagement when cusps of maxillary teeth are not located between two mandibular teeth.

In addition, it is preferable that the positional abnormality classification step includes determining a degree of detail based on a scale of numerical values, which serve as a determination basis for each malocclusion, to set the degree of detail together with malocclusion classification information.

In addition, it is preferable that the orthodontic data generation step includes generating data, which is obtained by converting mesh information of a tooth image derived from the three-dimensional oral scan data, into an object format simulated in a first program, together with the oral state information before treatment.

In addition, it is preferable that the method further includes, after the orthodontic data generation step: a pre-treatment oral state information loading step of loading the oral state information before treatment, which is generated using a result of performing the orthodontic data generation step; a predicted tooth arrangement model deriving step of deriving one or more target predicted tooth arrangement models by an algorithm pre-learned with learning data about tooth arrangement, in consideration of a predicted movement direction and a predicted moving amount of the individual tooth included in the oral state information about the examinee before treatment; an orthodontic treatment plan presentation step of selecting an orthodontic solution for implementing the predicted tooth arrangement models, subdividing an orthodontic treatment plan for each step, and presenting the subdivided orthodontic treatment plan; and a feedback collection step of collecting a feedback for the presented orthodontic treatment plan by selecting one or more specialists matching the oral state information about the examinee before treatment from a specialist pool in which a plurality of specialists engaged in an orthodontic treatment field are registered.

In addition, it is preferable that in the orthodontic treatment plan presentation step, a predicted value of an element including at least one of a period of orthodontic treatment, orthodontic force, and difficulty of the orthodontic treatment according to a current tooth state of the examinee is used as an objective function, a plurality of orthodontic treatment plans are presented by searching for a Pareto optimal solution that allows a value of the objective function to be minimized while satisfying the objective function using a Pareto optimal solution calculation technique, and when the plurality of orthodontic treatment plans are derived through the Pareto optimal solution calculation technique, an optimal orthodontic treatment plan for the oral state information about the examinee before treatment is calculated from the plurality of orthodontic treatment plans by using a candidate algorithm including at least one of an artificial neural network (ANN), a random forest (RF), a support vector machine (SVM), and an evolving deep network (EDN).

In addition, it is preferable that when the pre-treatment oral state information loading step is performed, image data including at least one of an X-ray image, an intraoral image, and a facial image for the oral state information about the examinee before treatment are further collected as reference data, and the reference data is used only as a condition variable of the candidate algorithm.

In addition, it is preferable that in the orthodontic treatment plan presentation step, a time series tooth movement path for implementing the predicted tooth arrangement model from the oral state information about the examinee before treatment is processed and provided as a visualization model, based on the calculated optimal orthodontic treatment plan.

In addition, it is preferable that when the feedback collection step is performed, the selection of the specialist is performed by selecting a specialist whose clinical experience corresponding to the oral state information about the examinee before treatment is determined to be equal to or greater than a preset threshold reference, and in the feedback collection step, supervised learning is performed on the algorithm by labeling the feedback collected by the one or more specialists.

Meanwhile, an apparatus for recommending an orthodontic treatment plan by separating a tooth object from a three-dimensional oral scan data and automatically determining a positional abnormality of a tooth, which is implemented by a computing device including one or more processors and a main memory for storing instructions executable in the processors, include: an initial contact point search unit which gradually increases a size of a circle from a center of simple coordinates of the three-dimensional oral scan data, which corresponds to oral state information about an examinee before treatment, to search for an initial contact point at which the circle makes contact with an object included in the three-dimensional oral scan data; a sphere arrangement unit which, after one or more spheres spread into the tooth at preset intervals from the searched initial contact point, reverses a vector direction of a mesh, duplicates the spheres while moving the spheres at a random speed in a peripheral direction from reference coordinates, and uniformly arranges the spheres inside the tooth; a feature data extraction unit which determines a representative sphere corresponding to each tooth by increasing sizes of the spheres, which are duplicated in the sphere arrangement unit, to a preset size, and extracts feature data about the tooth based on a contact point and coordinates of the determined representative sphere; an image processing unit which implements, as a three-dimensional image, an examinee's tooth arrangement in which teeth are individually separated by using feature data extracted for each tooth and axis data for each tooth to acquire mesh information about an individual tooth; a positional abnormality classification unit which applies a relative arrangement state of tooth objects included in tooth arrangement data, which is generated in the image processing unit, to an automatic diagnosis algorithm, to automatically classify a plurality of positional abnormalities including at least a form of malocclusion; and an orthodontic data generation unit which combines classification results for an image of each tooth, data about each tooth, identification information about each tooth, and a positional abnormality for each tooth, to generate oral state information about the examinee before treatment, according to a result of performing a function of the positional abnormality classification unit.

On the other hand, a computer-readable recording medium that stores instructions for allowing a computing device to perform the following steps, wherein the steps include: an initial contact point search step of gradually increasing a size of a circle from a center of simple coordinates of the three-dimensional oral scan data, which corresponds to oral state information about an examinee before treatment, to search for an initial contact point at which the circle makes contact with an object included in the three-dimensional oral scan data; a sphere arrangement step of, after spreading one or more spheres into the tooth at preset intervals from the searched initial contact point, reversing a vector direction of a mesh, duplicating the spheres at a preset period while moving the spheres at a random speed in a peripheral direction from reference coordinates, and uniformly arranging the spheres inside the tooth; a feature data extraction step of determining a representative sphere corresponding to each tooth by increasing sizes of the spheres, which are duplicated in the sphere arrangement step, to a preset size, and extracting feature data about the tooth based on a contact point and coordinates of the determined representative sphere; an image processing step of implementing, as a three-dimensional image, an examinee's tooth arrangement in which teeth are individually separated by using feature data extracted for each tooth and axis data for each tooth to acquire mesh information about an individual tooth; a positional abnormality classification step of applying a relative arrangement state of tooth objects included in tooth arrangement data, which is generated in the image processing step, to an automatic diagnosis algorithm, to automatically classify a plurality of positional abnormalities including at least a form of malocclusion; and an orthodontic data generation step of combining classification results for an image of each tooth, data about each tooth, identification information about each tooth, and a positional abnormality for each tooth, to generate oral state information about the examinee before treatment, according to a result of performing the positional abnormality classification step.

Advantageous Effects

According to one embodiment of the present invention, it is possible to solve the problem in that dental specialists have to manually separate a tooth and a gum from the three-dimensional oral scan data using a dedicated three-dimensional (3D) special program in the related art, and it is possible to separate an individual object of the tooth by extracting a contact point and a feature point of the individual tooth from the three-dimensional oral scan data, thereby enhancing the ease of processing tooth image data.

Furthermore, according to the present invention, unlike the conventional method for extracting tooth feature data based on an external shape of the tooth, it is possible to extract tooth feature data based on detection of coordinate system data to which physical characteristics of the tooth are applied, thereby providing a new approach to extraction of the tooth feature data.

In addition, according to the present invention, compared to the existing technologies, it is possible to not only extract tooth data that may be simulated based on three-dimensional oral scan data, but also apply a classification algorithm for diagnosis results, which can be automatically learned through diagnosis results of skilled doctor based on the extracted tooth data, thereby generating oral state information before treatment such that a specialized treatment plan may be established regardless of the skill of the dentist.

In addition, according to the present invention, an optimal tooth arrangement model is selected by a preset algorithm based on a tooth state and possibility of movement of the individual tooth, which are confirmed in oral state information of an examinee before treatment, and an algorithm for recommending an orthodontic treatment plan reflecting characteristics of the individual tooth is provided, so that it is possible to promote standardization of orthodontic diagnosis and an orthodontic treatment plan.

In addition, according to one embodiment of the present invention, unstructured diagnosis data is standardized to utilize the same as reference data for presenting a tooth orthodontic treatment plan, so that it is possible to achieve an algorithm structuration design based on know-how and theory for tooth orthodontic treatment, and specialists capable of performing the orthodontic treatment plan derived for the oral state information about the examinee before treatment are matched, thereby increasing a reproduction rate of the recommended orthodontic treatment plan and the orthodontic treatment result.

DESCRIPTION OF DRAWINGS

FIG. 1 is a flowchart of a method for recommending an orthodontic treatment plan by separating a tooth object from three-dimensional oral scan data and automatically determining a positional abnormality of a tooth according to one embodiment of the present invention.

FIG. 2 is an example for explaining a flow in which representative coordinates and a contact point of the tooth for generating tooth data are extracted according to one embodiment of the present invention.

FIG. 3 is an example in which feature data for each individual tooth is extracted and implemented as a table according to one embodiment of the present invention.

FIG. 4 is an example for explaining a flow in which information about an axis of the tooth is extracted according to one embodiment of the present invention.

(a) to (g) of FIG. 5 are examples in which a positional abnormality of the tooth is classified based on tooth data according to implementation of one embodiment of the present invention.

FIG. 6 is an example in which a tooth arrangement model corresponding to oral state information of an examinee before treatment is implemented based on the loaded oral state information before treatment according to one embodiment of the present invention.

FIG. 7 is an example in which a predicted tooth arrangement model for the oral state information about the examinee before treatment is derived according to one embodiment of the present invention.

FIG. 8 is an example of an instance configuration scheme of an algorithm that is used to provide a solution for orthodontic treatment according to one embodiment of the present invention.

FIG. 9 is an example for a problem solving technique of a candidate algorithm derived by an optimal orthodontic treatment plan according to one embodiment of the present invention.

FIG. 10 is an example of providing an interface according to deriving the optimal orthodontic treatment plan in one embodiment of the present invention according to one embodiment of the present invention.

FIG. 11 is a configuration diagram of an apparatus for recommending an orthodontic treatment plan by separating a tooth object from three-dimensional oral scan data and automatically determining a positional abnormality of a tooth according to one embodiment of the present invention.

FIG. 12 is a view showing an example of an internal configuration of a computing device according to one embodiment of the present invention.

BEST MODE

Hereinafter, various embodiments and/or aspects will be disclosed with reference to drawings. In the following description, multiple concrete details will be disclosed in order to help general understanding of one or more aspects for the purpose of description. However, it will also be appreciated by those skilled in the art to which the present invention pertains that such aspect(s) may be practiced without the specific details. In the following description and accompanying drawings, specific exemplary aspects of one or more aspects will be described in detail. However, the aspects are exemplary, and some equivalents of various aspects may be used, and the descriptions herein are intended to include both the aspects and equivalents thereto.

It is not intended that any "embodiment", "example", "aspect", "illustration", and the like used in the specification is preferable or advantageous over any other "embodiment", "example", "aspect", "illustration", and the like.

Further, the terms "includes" and/or "including" mean that a corresponding feature/or component exists, but it should be appreciated that the terms "include" or "including" mean that presence or addition of one or more other features, components, and/or a group thereof is not excluded.

Further, terms including an ordinal number such as "first" or "second' may be used for the names of various components, not limiting the components. The above terms are used merely for the purpose of distinguishing one element from another element. For example, a first component may be referred to as a second component and vice versa without departing the scope of the present invention. The term "and/or" includes any combination of a plurality of described relevant items, or one of the described relevant items.

In addition, unless otherwise defined, all terms used herein, including technical or scientific terms, have the same meaning as commonly understood by one of ordinary skill in the art to which this invention belongs. Terms as those defined in generally used dictionaries are to be interpreted to have the meanings consistent with the contextual meanings in the relevant field of art, and are not to be interpreted to have idealistic or excessively formalistic meanings unless explicitly defined in the embodiments of the present invention.

The present invention relates to a method for recommending an orthodontic treatment plan by separating a tooth object from three-dimensional scan data and automatically determining a positional abnormality of a tooth, in which a first object of the present invention is to provide a technology for separating a tooth object based on a contact point and a feature point of an individual tooth in three-dimensional oral scan data, a second object of the present invention is to provide a technology capable of automatically performing diagnosis, which serves as a treatment basis for treatment in orthodontic dental, based on three-dimensional oral scan data through construction of a model and machine learning, specifically, deep learning of the model by efficiently analyzing tooth data about a patient in the orthodontic dental field to derive results of automatically performing the diagnosis in the orthodontic dental field for each tooth. and a third object of the present invention is to select an optimal tooth arrangement structure by a preset algorithm based on a tooth state and possibility of movement of an individual tooth, which are confirmed in oral state information of an examinee before treatment, and to provide an algorithm for recommending an orthodontic treatment plan reflecting characteristics of the individual tooth.

Hereinafter, the present invention will be described in more detail with reference to the accompanying drawings, and a plurality of drawings may be simultaneously referred to describe one or more technical features or components constituting the present invention.

First, referring to FIG. 1, in the present invention, an initial contact point search step S10 of gradually increases a size of a circle from a center of simple coordinates of the three-dimensional oral scan data, which corresponds to oral state information about an examinee before treatment, to search for an initial contact point at which the circle makes contact with an object included in the three-dimensional oral scan data, may be performed.

In this case, the three-dimensional oral scan data is data configured in the format of a 33-dimensional oral scan image, which is generally obtained from a head scan device of an examinee in the dental filed, such as a st1 object. The st1 file format may be understood as a substantial standard data transmission format in the high-speed prototype manufacturing industry, and in the present invention, in addition to the above-described st1 file format, the format of various types of three-dimensional oral scan images that may be obtained through a three-dimensional scanner in the dental field may be used.

As a more specific embodiment for the above-described step S10, referring to FIG. 2, an example 101 in which a circle is disposed at the center of simple coordinates of the three-dimensional scan data about the examinee in S1 of FIG. 2 may be shown, and an example 111 in which an initial contact point with a tooth object is searched by increasing a size of the circle disposed at the center of the simple coordinate in step S2 of FIG. 2 may be shown.

That is, in the above-described step S10, the size of the circle is increased at the center of the simple coordinates of the three-dimensional oral scan data so that an initial point that makes contact with the tooth object of the examinee is searched, thereby easily and simply recognizing a position of the tooth object on the three-dimensional oral scan data.

Referring back to FIG. 1, after step S10 is performed, a sphere arrangement step S20 of, after spreading one or more spheres into the tooth at preset intervals from the searched initial contact point, reversing a vector direction of a mesh, duplicating the spheres while moving the spheres at a random speed in a peripheral direction from reference coordinates, and uniformly arranging the spheres inside the tooth, may be performed.

In this case, in step S20 described above, a plurality of spheres are spread at a predetermined interval at the initial contact point searched in step S10 so that the spheres are located inside the tooth, and a size of the spread spheres is in a range of 1 to 5 units, in which one unit has a size corresponding to 1/10,000 mm, and it may be understood that it is the size of the spheres derived according to the result of performing empirical tuning in order to find a size of the spheres suitable for the three-dimensional tooth scan data.

Meanwhile, in general, an STL file has characteristics of representing a surface of a stereoscopic object as numerous triangular surfaces in three dimensions, and the conventional STL file format has a problem in that it is easy to detect an event of colliding with a surface of the tooth object in three-dimensional scan data, whereas it is not easy to detect an event of escaping from the inside of the tooth object to the outside.

Accordingly, in order to solve such a problem, the present invention performs a process of reversing a direction vector, which is defined on a surface of each mesh information formed of triangles, to regenerate triangle data in a reverse direction, and a detailed embodiment thereof will be described with reference to FIG. 2.

In detail, S3 of FIG. 2 shows an appearance of a tooth object before a direction reversion of mesh information T is performed, and S4 of FIG. 3 shows an appearance of a tooth object UT after the direction reversion of the mesh information T is performed.

In addition, S5 of FIG. 2 shows an example in which as the reversion processing of the mesh information is performed, a plurality of spread spheres exist inside the tooth, and thus a plurality of spheres 121 are duplicated at a preset period while moving at a random speed, and the spheres 121 may be uniformly arranged inside the tooth by repeating the duplication process of the spheres 121.

Meanwhile, after step S20 is performed, a feature data extraction step S30 of determining a representative sphere corresponding to each tooth by increasing sizes of the spheres, which are duplicated in the sphere arrangement step, to a preset size, and extracting feature data about the tooth based on a contact point and coordinates of the determined representative sphere, is performed.

In addition, in step S30 described above, the size of the plurality of spheres spread inside the tooth may be gradually increased to remove the sphere that fall outside the tooth in an inner space of the tooth, and the spheres remaining inside the tooth may be reduced to a preset size, thereby determining a representative sphere corresponding to a center point of each tooth.

In this case, it is preferable that the size of the spheres is increased until the number of spheres remaining inside the tooth corresponds to the number of teeth of the examinee. For example, when the number of mandibular teeth of the examinee is 14, the size increase of the spheres may continue until 14 teeth corresponding to the number of the mandibular teeth remain.

In addition, the determination of the representative sphere according to the size increase and reduction of the spheres is preferably performed on maxilla and mandible, respectively, which may be understood to reflect that the number of maxillary teeth and mandibular teeth may be different according to an oral structure including an excretion state of the examinee.

As a specific example, referring to S6 of FIG. 2, an example in which a representative sphere 131 for each tooth is determined with respect to the teeth included in the mandible of the examinee is shown, and in the present invention, feature data may be extracted using coordinate values of the representative sphere 131 determined for each individual tooth of the examinee.

In this case, it is preferable that the coordinate value of the representative sphere 131 is obtained by extracting a coordinate value of x, y, and z planes for position, rotation, and scale of the three-dimensional space.

As an example, 200 of FIG. 3 shows an example in which feature data about the individual tooth is extracted by acquiring coordinate information about x, y, and z planes for position, rotation, and scale from the representative sphere determined for each tooth.

However, although 200 of FIG. 3 shows only the feature data of seven individual teeth, this is merely an embodiment, and it should be understood that the feature data about the teeth mentioned in the present invention is extracted in the number corresponding to the number of teeth of the examinee.

Next, after step S30 is performed, an image processing step S40 of implementing, as a three-dimensional image, an examinee's tooth arrangement in which teeth are individually separated by using feature data extracted for each tooth and axis data for each tooth to acquire mesh information about an individual tooth, is performed.

In this case, the above-mentioned axis data for each tooth may be extracted based on a volume center point and a width center point of the three-dimensional oral scan data.

Specifically, as for the above-described axis data for each tooth, axis data obtained parallel to a root of the tooth is extracted as axis data for each tooth by applying a numerical correction value, which is derived through statistical analysis, to a line passing through the volume center point and the width center point.

Referring to FIG. 4, as one embodiment, it can be seen that in 600 of FIG. 4, a volume center point VC and a width center point AC for one individual tooth object are shown.

In this case, in the present invention, the axis data for each tooth is extracted as axis data about the individual tooth by applying the correction value, which is derived through statistical analysis, to a line passing through the volume center point VC and the width center point AC shown in FIG. 4 to derive an axis parallel to the root of the tooth, the above-described correction value may be a value obtained by continuously performing error learning on the axis data about the individual tooth by a learning module mounted on a computing device, and such correction values may be the same value, but may be derived as different values according to the shape of the individual tooth.

Meanwhile, it is preferable that in step S40 of FIG. 1, the mesh information about the individual tooth is converted into a preset file format compatible in a first program that handles motion data to export the mesh information, and work data is stored in the first program as a script file.

In this case, the first program may be preferably understood as a unity simulation, and the above-described preset file format may be understood as being converted into an obj file format compatible in unity.

Meanwhile, when such an obj file is imported from the unity simulation, a coordinate axis alignment problem occurs, and thus re-adjustment thereof is required, and in the present invention, an image processing process may be further preferably performed to set a center point of the obj file format as a volume center point for rotation of the individual tooth, and to obtain coordinate values for the individual tooth from Rhino and arrange the coordinate values in the shape of tooth.

After performing the image processing process of arranging the coordinate values in the shape of tooth, a process of storing work data in the first program, that is, the unity as a script file format may be performed.

In this case, the above-described work data may be understood as a series of treatment plan data related to the re-arrangement of dentition, such as changing the arrangement of individual teeth requiring orthodontic treatment by dental specialists, and such a script file may be used as basic data in the application field for the automation of the orthodontic treatment plan.

Next, after step S40 is performed, a positional abnormality classification step S50 of applying a relative arrangement state of tooth objects included in tooth arrangement data, which is generated in step S40, to an automatic diagnosis algorithm, to automatically classify a plurality of positional abnormalities including at least a form of malocclusion, is performed.

That is, in step S50 described above, a tooth image is processed by deriving an axis of the tooth based on mesh information for each tooth about the tooth image acquired in step S40 to generate tooth data for each tooth, that is, data including the above-described feature data and the derived axis of the tooth.

Meanwhile, for the axis of the tooth, a process of deriving the axis may be performed as in the example of FIG. 4.

For example, in the image processing step, the mesh information T about all teeth is processed as described above to automatically derive three-dimensional data for each tooth, that is, a volume center point VC and a width center point AC from mesh information ET, for learning of individual teeth. The volume center point VC may be understood as a center point of a volume of each tooth data, and the width center point AC may be understood as, for example, an area center point of a portion having the widest area of the tooth or a center point of a surface corresponding to the uppermost surface of the tooth.

A line passing through the volume center point VC and the width center point AC is primarily selected as an axis of the corresponding tooth. Meanwhile, according to the above-described tooth image processing algorithm, the above-described tooth data, for example, an error correction function for the above-described axis of the tooth is derived through statistical analysis on tooth image processing results. Thus, the passing line is corrected by using the derived numerical correction value to set the line corrected as described above as an axis A of the tooth.

Accordingly, through machine learning for the three-dimensional data about the tooth, that is for shape/movement characteristics and statistical analysis on the model, the axis parallel to the root of the tooth may be automatically derived and used as tooth data, and may be used in simulations for establishing a treatment plan.

Meanwhile, as described above, the mesh information about the individual tooth may be converted into, for example, an obj format that may be used in simulations such as unity. Such an obj format may be combined with the above-described tooth data. In this case, when implementing a Rhino three-dimensional modeling tool automation program using a program such as Python, etc., all processes of working using the corresponding tool may be automated with a script to respond to an automation service.

That is, through such format conversion, data, which may implement the dental arrangement of the examinee in three dimensions by applying the coordinates and the contact point of the tooth and the axis data about the tooth to each tooth image, may be generated as the above-described tooth data and used for subsequent processing, and such image format conversion may be performed in an orthodontic data generation step S50 to be described later.

In addition, in step S50 described above, a function of applying a relative arrangement state of tooth objects included in tooth arrangement data, which is generated in step S40, to an automatic diagnosis algorithm, to automatically classify a plurality of positional abnormalities including at least a form of malocclusion, is performed.

The relative arrangement state of tooth objects means a relative state for arrangement of teeth on upper, lower, left, and right sides. This may be derived by comparing the above-described tooth data, that is, tooth data for adjacent teeth based on information about the coordinates, contact point, and axis of each tooth.

The automatic diagnosis algorithm may be learned by the above-described machine learning, and a specific comparison process, that is, learning of the automatic diagnosis algorithm as described later may be understood as learning of a comparison reference value and the like, which is used in the corresponding comparison process, in automatically determining a positional abnormality of the tooth according to the specific comparison process to be described later, or as learning of the specific comparison process itself.

An example thereof is shown in detail in FIG. 5. First, (a) of FIG. 5 means abnormal classification A corresponding to crowding. The crowding means a case in which mesiodistal contact points of adjacent teeth overlap each other, which is determined first based on whether the teeth are arranged overlapping each other, that is, whether the contact points between the teeth do not meet each other and intersect.

When the corresponding determination result is No, it is determined as normal arrangement when the contact points meet each other and the arrangement is normal, and otherwise, it is classified as a special situation and data about the situation is provided to the medical staff and a special determination instruction is requested. The result of the corresponding special determination instruction may be used as learning of the above-described automatic diagnosis algorithm. Meanwhile, when a space exists without overlapping, it is evaluated as spacing to be described later, and otherwise, it is also classified as a special situation.

Meanwhile, when the corresponding determination result is Yes, a relative degree of crowding is determined based on the degree to which the teeth overlap each other. That is, for example, it is determined that the degree of crowding is 1 when the degree to which the teeth overlap each other is −2 mm or less, the degree of crowding is 2 when the degree to which the teeth overlap each other is −2 to −4 mm, and the degree of crowding is 3 when the degree to which the teeth overlap each other is −4 mm or greater.

Meanwhile, (b) of FIG. 5 means abnormal classification B corresponding to spacing described above. The spacing means a case where the mesiodistal contact points of adjacent teeth are spaced apart from each other to generate spaces between the teeth. First, it is determined whether the teeth are arranged spaced apart from each other, that is, whether the contact points between the teeth do not overlap each other and spaces exist therebetween.

When the corresponding determination result is No, it is evaluated as normal arrangement when the contact points meet each other and the arrangement is normal, and the above-described crowding evaluation is performed when the spaces do not exist and the contact points overlap each other. Meanwhile, when the contact points meet each other, but the arrangement is abnormal or when the spaces do not exist and the contact point do not overlap each other, it is also classified as a special situation as described above.

Meanwhile, the corresponding determination result is Yes, a relative degree of spacing is determined based on a width between spaces spaced apart from each other. It is determined that the degree of spacing is 1 when the width between the spaces is 2 mm or less, the degree of spacing is 2 when the width between the spaces is 2 to 4 mm, and the degree of spacing is 3 when the width between the spaces is 4 mm or greater.

(c) of FIG. 5 means abnormal classification C corresponding to rotation. The rotation means a case in which it is determined that the teeth are rotated as the mesiodistal contact points deviate from a normal arrangement line. In this case, it is determined whether the teeth are rotated based on the corresponding arrangement line.

When the corresponding determination result is No, it is determined as normal arrangement when the contact points meet each other and the arrangement is normal, and when it is determined that a complex aspect in which the teeth are rotated and the spacing and the crowding are shown is exhibited, complex classification is performed by performing the crowding and spacing evaluation together. If the determination result is NO, but the arrangement is abnormal or the complex aspect is not exhibited, it is also classified as a special situation and a special determination instruction is requested.

When the corresponding determination result is Yes, the degree of rotation is determined according to a relative degree of rotation of teeth. For example, it is determined that the degree of rotation is 1 when the teeth is rotated by 4° or less, the degree of rotation is 2 when the teeth is rotated by 4° to 8°, and the degree of rotation is 3 when the teeth is rotated by 8° or greater.

(d) of FIG. 5 means a positional abnormality D corresponding to openbite & deepbite. The openbite & deepbite is an evaluation for the degree of overbite of upper and lower teeth, in which all maxillary teeth need to cover the mandibular teeth. When such a relationship is not satisfied, it is classified as abnormal classification D corresponding to openbite & deepbite, and a first preset numerical value is set as a normal numerical value to suit characteristics of each tooth. The corresponding first numerical value may be also set by the above-described learning through sample data.

In the corresponding classification process, it is determined whether the first numerical value coincides with the normal numerical value to suit the above-described characteristics of each tooth or is within a range of the normal numerical value. When the determination result is Yes, it is determined as a normal state when the vertical overbite is normal compared to a reference value, and otherwise, it is classified as a special situation and a special determination instruction is requested as described above.

When the determination result is No, it is determined whether the vertical overbite is insufficient compared to the reference value, and when the vertical overbite is insufficient, it is determined according to a degree of insufficiency that the degree of insufficiency is 1 when the vertical overbite is 0 mm or less, the degree of insufficiency is 2 when the vertical overbite is 0 to −3 mm, and the degree of insufficiency is 3 when the vertical overbite is −3 mm or greater. When the vertical overbite is sufficient and excessive, it is determined according to a degree of excessiveness that the degree of excessiveness is 1 when the vertical overbite is 2 mm or less than the reference value, the degree of excessiveness is 2 when the vertical overbite is 2 mm to 4 mm, and the degree of excessiveness is 3 when the vertical overbite is 4 mm or greater.

(e) of FIG. 5 means abnormal classification E corresponding to tilt of a mesiodistal tooth axis (tipping). The tilt of the mesiodistal tooth axis means a classification of a state in which an inclination of the tooth on a mesiodistal surface of each tooth is excessively inclined mesially or excessively inclined distally.

In the corresponding process, first, it is determined whether the inclination of the tilt of the mesiodistal tooth axis of each tooth coincides with a given preset second numerical value. Such a second numerical value may be also set by the above-described algorithm learning through sample data.

When the corresponding determination result is Yes, it is determined as a normal state when the inclination of the tilt of the tooth axis is 2° or less or is normal, and otherwise, it is classified as a special situation and a special determination instruction is requested.

Meanwhile, when the corresponding determination result is No, it is determined whether the excessive tilt is directed to the mesial side, and when the excessive tilt is directed to neither the mesial side nor the distal side, it is classified as a special situation and a special determination instruction is requested. On the other hand, when the excessive tilt is directed to the mesial side, it is determined that a degree of tilt to the mesial side is 1 when the degree of inclination is 4° or less, the degree of tilt to the mesial side is 2 when the degree of inclination is 4° to 8°, and the degree of tilt to the mesial side is 3 when the degree of inclination is 8° or greater.

When the excessive inclination is directed to the distal side, it is determined according to the degree of inclination that the degree of inclination to the distal side is 1 when the degree of inclination is −4° or less, the degree of inclination to the distal side is 2 when the degree of inclination is −4° to −8°, and the degree of inclination to the distal side is 3 when the degree of inclination to the distal side is −8° or greater.

(f) of FIG. 5 means abnormal classification F corresponding to tilt of a buccalingual tooth axis (torque). The tilt of the buccalingual tooth axis means a classification of determining whether a degree of inclination of the tooth on a buccalingual surface of each tooth is buccal excessive tilt or lingual excessive tilt. First, in the corresponding process, it is determined whether the inclination of the tilt of the boccolingual tooth axis of each tooth coincides with a given preset third numerical value. Such a third numerical value may be set as a numerical value different from a numerical value of the above-described tilt of the mesiodistal tooth axis, and may be set by algorithm learning through sample data.

When the corresponding determination result is Yes, it is determined as a normal state when the inclination of the tilt of the tooth axis is 2° or less or is normal, and otherwise, it is classified as a special situation and a special determination instruction is requested.

Meanwhile, when the corresponding determination result is No, it is determined whether is the excessive tilt is directed to the lingual side, and when the excessive tilt is directed to neither the lingual side nor the buccal side, it is classified as a special situation and a special determination instruction is requested. On the other hand, when the excessive tilt is directed to the buccal side, it is determined that the degree of tilt to the buccal side is 1 when the degree of inclination is 4° or less, the degree of tilt to the buccal side is 2 when the degree of inclination is 4° to 8°, and the degree of tilt to the buccal side is 3 when the degree of inclination is 8° or greater.

When the excessive inclination is directed to the lingual side, it is determined according to the degree of inclination that the degree of tilt to the lingual side is 1 when the degree of inclination is –4° or less, the degree of tilt to lingual side is a 2 when the degree of inclination is –4° to –8°, and the degree of tilt to the lingual side is 3 when the degree of inclination is –8° or greater.

(g) of FIG. 5 shows abnormal classification G corresponding to engagement. The engagement means classification of evaluating and determining a state of upper and lower interdental occlusion. The determination is made based on whether a state of engagement like sawteeth is normal as an occlusal state of a 1:2 relationship between the teeth, and the evaluation is made based on whether cusps of the maxillary teeth are located at cusps of the mandibular teeth.

The classification is performed by marking the front (mesial) position as '–', and the rear (distal) position as '+'. First, in the corresponding process, the upper and lower teeth of a posterior tooth part need to be arranged like sawteeth in the front and rear (mesiodistal) surfaces, and it is determined whether the cusps of the maxillary teeth are located between the two mandibular teeth.

When the corresponding determination result is Yes, it is determined as a normal state when the engagement of maxillary and mandibular posterior tooth parts is normal, and otherwise, it is classified as a special situation and a special determination instruction is requested.

When the corresponding determination result is No, it is determined whether the maxillary teeth are located to lean forward, and when the maxillary teeth are located to lean forward, it is determined according to the degree of leaning that the degree of location in the rearward direction for the mandible is 1 when the maxillary teeth are located to lean forward by 2 mm or less, the degree of location in the rearward direction for the mandible is 2 when the maxillary teeth are located to lean forward by 2 mm to 4 mm, and the degree of location in the rearward direction for the mandible is 3 when the maxillary teeth are located to lean forward by is 4 mm or greater. Meanwhile, when the maxillary teeth are located to lean rearward, it is determined according to the degree of leaning that the degree of location in the forward direction for the mandible is 1 when the maxillary teeth are located to lean rearward by –2 mm or less, the degree of location in the forward direction for the mandible is 2 when the maxillary teeth are located to lean rearward by –2 mm to –4 mm, and the degree of location in the forward direction for the mandible is 3 when the maxillary teeth are located to lean rearward by –4 mm or greater.

As described above, when a determination basis for the malocclusion is classified into seven and the above-described reference values are learned through the sample data learning and the actual case learning, or the algorithm is learned through the instruction for special determination by the medical staff in a special situation, very accurate determination may be made according to the determination basis for the malocclusion, thereby making it possible to establish an efficient and clear treatment solution at the time of subsequent diagnosis.

Furthermore, in step S50 described above, the degree of detail may be determined based on scale of the numerical value that is the determination basis for each malocclusion and may be set together in the malocclusion classification information, and the present invention is not limited thereto.

Meanwhile, after step S50 is performed, an orthodontic data generation step S60 of combining classification results for an image of each tooth, data about each tooth, identification information about each tooth, and a positional abnormality for each tooth by using the tooth data generated in step S40 and according to the classification results in step S50, to generate oral state information about the examinee before treatment, is performed.

In this case, in step S60 described above, the oral state information about the examinee before treatment includes, for example, a tooth image as independent mesh information of each tooth, tooth data including feature data and the axis, identification information for each tooth, and a classification result for a positional abnormality classified for each tooth. In addition, the corresponding data may be stored in, for example, a database 20, and accordingly, may be used for automatic treatment simulation using AI or treatment plan establishment.

Meanwhile, as described above, in order to use the oral state information before the corresponding treatment in the automatic treatment simulation or the treatment plan establishment, movement by orthodontics or the like needs to be possible for each tooth, and thus, as described above, it may be converted into an obj format that may be used in, for example, simulation such as unity. Such an obj format may be combined with the above-described tooth data.

That is, when the data is converted into the above-described format in step S60, when the Rhino three-dimensional modeling tool automation program is implemented using a program such as Python, all processes of working using the corresponding tool are automated with a script to correspond to an automation service, and thus through such a format conversion, the data, which may implement the tooth arrangement of the examinee in three dimensions by applying the coordinates and contact points of the tooth and the axis data about the tooth to each tooth image, is generated as the above-described tooth data to be used for subsequent processing.

On the other hand, as another embodiment of the present invention, the method may further include, after step S60 is performed, as a process for recommending an orthodontic treatment plan: a pre-treatment oral state information loading step (not shown) of loading the oral state information before treatment, which is generated using a result of performing the orthodontic data generation step; a predicted tooth arrangement model deriving step (not shown) of deriving one or more target predicted tooth arrangement models by an algorithm pre-learned with learning data about tooth arrangement, in consideration of a predicted movement direction and a predicted moving amount of the individual tooth included in the oral state information about the examinee before treatment; an orthodontic treatment plan presentation step of selecting an orthodontic solution for implementing the predicted tooth arrangement models, subdividing an orthodontic treatment plan for each step, and presenting the subdivided orthodontic treatment plan; and a feedback collection step (not shown) of collecting a feedback for the presented orthodontic treatment plan by selecting one or more specialists matching the oral state information about the examinee before treatment from a specialist pool in which a plurality of specialists engaged in an orthodontic treatment field are registered.

In this case, in the oral state information loading step, the oral state information before treatment, which is shown in FIG. 6, may be implemented as a three-dimensional image.

In this case, it may be understood that A of FIG. 6 is preferably understood as a simulation example of a state in which the coordinate value of the individual tooth is not transmitted from the Rhino, and B of FIG. 6 is an example in which the coordinate value of the individual tooth is transmitted from the Rhino to define a position, rotation angle, and size of the individual teeth, thereby implementing the oral state information corresponding to the current tooth state of the examinee, that is, before treatment, as a three-dimensional image.

That is, according to the present invention, by performing the above-described oral state information loading step, a three-dimensional image that more clearly implements the current dental state of the examinee may be acquired, and thus the precision of designing an orthodontic treatment plan to be described later may be increased.

Meanwhile, as a more preferred embodiment of the present invention, when the oral state information loading step is performed, according to the present invention, image data including at least one of an X-ray image, an intraoral image, and a facial image for the oral state information about the examinee before treatment may be further collected as reference data, and the reference data may be used only as a condition variable of the candidate algorithm to be described later.

More specifically, the above-described X-ray image may be understood as an image including a cephalogram corresponding to an X-ray image of a side surface portion of a face, which contains the most important information in the orthodontic treatment, and including a panorama in which a camera is moved from one side to the other side or from top to bottom to capture a wide range of scenes, and the above-described intraoral image may be understood as an image obtained by simply capturing an intraoral image as a 2D image using the camera, and the above-described facial image may be understood as an image representing the appearance of the face according to the oral structure and tooth state of the examinee.

In this case, in the present invention, horizontal/vertical relationships between the maxilla and mandible may be measured from a cephalometric image collected as reference data, a protrusion of upper front teeth and protrusion of lower front teeth may be measured, a missing value may be determined from a panoramic image, a health condition of an alveolar bone may be determined by a quantified value, and an excessive tooth axis tilt, the presence of a wisdom tooth/cavity, and the number of implants may be measured.

Furthermore, the number of cavities, the number of filling materials, and the number of crowns may be measured in the above-described intraoral image, and horizontal/vertical/lateral evaluation may be performed in the facial image.

That is, in the present invention, through the collection of the above-described reference data and the measurement value of the collected reference data, a database of unstructured diagnostic data may be made in the same format as the structured data, and accordingly, the classification and definition of the standard diagnostic data for the orthodontic treatment plan may be designed.

Next, a predicted tooth arrangement model mentioned in a predicted tooth arrangement model deriving step and derived described above may be derived as a model closest to a standard model having an ideal tooth arrangement in the orthodontic treatment field. In this case, the ideal tooth arrangement may be understood as a tooth arrangement in which a contact point between the teeth and a contact point between adjacent teeth do not overlap each other but make contact with each other, a mesiodistal contact point between the adjacent teeth make contact with each other, rotation angles of the teeth on the occlusal surfaces are within a normal range, when a degree of coverage of the upper and lower teeth is examined, all the maxillary teeth cover the mandibular teeth, inclinations of the teeth on the mesiodistal surfaces of each tooth are within the normal range, inclinations of the teeth on a buccolingual side surface of each tooth are normal, and engagement of upper/lower posterior tooth parts is leaned in any one direction or is not caused by occlusal of a 1:2 relationship.

That is, the above-described algorithm may machine-learn the learning data on the ideal tooth arrangement to derive the predicted tooth arrangement model that makes the most ideal tooth arrangement in the current tooth state of the examinee.

Meanwhile, a predicted movement direction and a predicted movement amount of the teeth may be predicted based on clinical data on the orthodontic treatment, and it may be understood that the movement direction and the movement amount of the teeth may be predicted by a random forest (RF) algorithm, which is one of the constituent algorithms of meta-learning, using the weak tool.

In this case, the meta-learning is a mechanism for deriving the best model among a plurality of learning models, and referring to 400 of FIG. 9, a conceptual diagram of meta-learning is shown in 400 of FIG. 9, and an algorithm including at least one of an artificial neural network (ANN), a random forest (RF), a support vector machine (SVIM), and an evolved deep network (EDN) as well as the above-described RF may be used as the meta-runner shown in 400 of FIG. 9.

Further, referring to FIG. 7 simultaneously, A of FIG. 7 shows an example of a three-dimensional image corresponding to the oral state information about the examinee before treatment, and B of FIG. 7 shows an example in which the predicted tooth arrangement model derived in the form that is closest to an ideal tooth arrangement in a current tooth state of the examinee is derived.

In this case, it can be seen in B of FIG. 7 that the tooth arrangement of the examinee is aligned more neatly compared to A of FIG. 7 by the algorithm in which the ideal tooth arrangement is learned.

Meanwhile, in order to present an orthodontic treatment plan, it is generally required to search for a solution that simultaneously satisfies conflicting factors such as a period of orthodontic treatment, orthodontic force, and difficulty of orthodontic treatment.

Accordingly, in the present invention, when the above-described orthodontic treatment plan presentation step is performed, a predicted value of an element including at least one (preferably including all) of a period of orthodontic treatment, orthodontic force, and difficulty of the orthodontic treatment according to the current tooth state of the examinee may be used as an objective function, and a plurality of orthodontic treatment plans may be presented by searching for a Pareto optimal solution that allows a value of the objective function to be minimized while satisfying the objective function using a Pareto optimal solution calculation technique.

Dominance Relationship and Pareto Optimum Solution

By identifying these Pareto optimal solutions, practitioners can offer patients a range of efficient treatment options that balance speed, comfort, and clinical success without unnecessary compromise.

As one embodiment, the minimization problem may be defined as a problem of minimizing a vector $F(x)=[f_1(x), f_2(x), \ldots, f_k(x)]^T$ having k objective functions while satisfying both an inequality sign constraint $g_i x \le 0, i = 1, \ldots, m$ and an equality sign constraint $h_j(x)=0$, $i = \{1, \ldots, p\}$ with respect to a vector $x=[x_1\ x_2 \ldots, x_n]^T$ having n determination variables.

Further, Pareto optimality means x in which there is no vector $v=F(x)=[f_1(x), \ldots, f_k(x)]$ which is $x' \in D$ dominating vector $u=F(x)=[f_1(x), \ldots, f_k(x)]^T$, when defining D as a determination space of all possible x which may be evaluated by the vector F(x), in which the concept of domination may be defined that the vector $v=(v_i, \ldots, v_k)$ satisfying $\forall_i \in \{1, \ldots, k\}$: $u_i \le v_i \wedge \exists_i \in \{i, \ldots, k\}$: $u_i < v_i$ dominates vector $v=(v_1, \ldots, v_k)$.

According to the above definition, it can be said that F object dominates a region to which G object belongs, and F object is again dominated by B object and C object.

The A, B, C, and D objects have an equivalent relationship that may not be compared with each other, and are not dominated by any object, so that the objects become the best solution for Pareto.

Further, in order to find a Pareto optimal solution that simultaneously optimizes the multi-objective function, a multi-optimization algorithm is used, and an arbitrary N initial population is generated and Pareto rankings are sequentially given in non-exclusive relation.

That is, a first rank is given to candidate solutions that are not dominated by any other object in the entire population in the multi-criterion evaluation, a first rank candidate solution is excluded from the entire population, and a second rank non-dominant population is selected from the remaining populations to be ranked.

When such operations are repeated, ranking is completed for all candidate solutions, and as a next step, a genetic operation including natural selection, intersection, and variation operations for generating a new candidate solution is sequentially applied.

In this case, in the natural selection step, all of the candidate solutions of the first priority may be included, and two candidate solutions may be arbitrarily selected for the remaining candidate solutions and a candidate solution of a higher priority may be included, and in the case of a candidate solution having the same priority, a solution having a low density of an object in an evaluation space of a multi-purpose function may be preferentially selected, and a non-dominance solution of the final step may be provided as a result of suggesting the correction treatment plan.

In the orthodontic treatment plan presentation step, when the plurality of orthodontic treatment plans are derived through the above-described Pareto optimal solution calculation technique, an optimal orthodontic treatment plan for the current state of the tooth of the examinee among the plurality of orthodontic treatment plans may be calculated by using a candidate algorithm including at least one of an artificial neural network (ANN), a random forest (RF), a support vector machine (SVM), and an evolved deep network (EDN).

In this case, the above-described ANN is an algorithm that simulates the neural network structure of the brain, and is well known as deep learning, and when multiple instances of big data level are secured, it has the advantage of inducing high performance by applying techniques such as increasing the number of layers, structural change, abstraction, and Drop Out.

In addition, the above-described RF has an advantage in that it exhibits higher performance than a single classifier by configuring a plurality of Weak Classifier and deriving collective intelligence in a form in which prediction values of respective classifiers are merged to derive one result value. Moreover, in the case of Weak Classifier, which consists of a decision tree, RF is able to generate a fairly fast model.

In addition, the above-described SVM has an advantage in that, when a set of data belonging to any one of the two categories is given, the SVM may generate a non-stochastic binary linear classification model that determines which category new data will belong to based on the given set of data, in a method of setting a region of a data class using Support Vector and deriving a boundary line.

In addition, the above-described EDN is a technique in which an evolutionary operation is applied to the deep network learning algorithm, and has an advantage in that a fast learning/processing speed and accuracy may be improved based on a plurality of Weak Classifiers.

That is, in the present invention, diversity is maximized by applying the evolutionary combination selection of multiple attribute data using the above-described candidate algorithm, and the performance of each Weak Classifier is improved through a deep network to induce the expression of collective intelligence, thereby enabling the establishment of an advanced orthodontic treatment plan.

Meanwhile, the optimal orthodontic treatment plan for the current tooth state of the examinee derived as described above may be implemented as an interface as shown in 500 of FIG. 10 to provide the orthodontic treatment plan customized to the examinee in stages.

In this case, in the above-described interface, a time series tooth movement path for implementing the predicted tooth arrangement model from the oral state information about the examinee before treatment based on the calculated optimal orthodontic treatment plan may be processed as a visualization model and provided as shown in 510 of FIG. 10, and in the present invention, the predicted result for orthodontic treatment of the examinee may be checked more intuitively by performing such a function.

On the other hand, in another preferred embodiment of the present invention, the above-described feedback collection step may be performed after the orthodontic treatment plan presentation step is performed.

In this case, the term "specialists" may be limited to those who have acquired the qualification of a specialist in orthodontics in order to improve the quality of orthodontic treatment, and it is preferable to select the specialist in which it is determined that the clinical experience corresponding to the oral state information about the examinee before treatment is equal to or greater than a preset threshold reference, and the reference for determining the clinical experience is preferably to allow the specialist to upload the case for proving his/her career in the specialist pool, to write an opinion of the case, and then to manage the clinical experience of the specialist by allowing validity evaluation of the case to be conducted from other specialists or an external specialist designated as the case examination committee.

In addition, when the above-described feedback collection step is performed, there are one or more or five or less specialists matching the oral state information about the examinee before treatment, so that smooth cooperation between specialists may be achieved.

Furthermore, in the feedback collection step, when the specialists matching the oral state information about the examinee before treatment are determined, feedbacks for the orthodontic treatment plan presented in the orthodontic treatment plan presentation step are collected, and in the present invention, supervise learning for the algorithm may be performed by labeling feedbacks collected from one or more specialists.

That is, according to the present invention, in deriving the orthodontic treatment plan using the machine learning-based algorithm, it is possible to promote the enhancement of presentation of the orthodontic treatment plan to be performed later by learning the results of presenting the problem in that has not been found by the specialists and the solution that is the treatment plan for the problem, and a method for configuring an instance for applying such machine learning may be shown with reference to 300 of FIG. 8.

In this case, it may be understood that before array of FIG. 8 is data indicating oral state information about the examinee before treatment, that is, a current tooth state, target array is data corresponding to a predicted tooth arrangement model of the examinee, and solution label is data corresponding to a final orthodontic treatment plan according to labeling the feedback collected from the specialists.

Meanwhile, in another embodiment of the present invention, when the final orthodontic treatment plan for the examinee is determined after the feedback collection step is performed, the computing device may perform a function of producing and processing the treatment plan for the final orthodontic treatment plan in a preset file format (including at least one of a PDF and a moving image file format) and transmitting the treatment plan to a company terminal including at least one of an internal dental hospital of the examinee and an orthodontic device manufacturer.

That is, the above-described embodiment may be understood as a process of documenting the orthodontic treatment plan as in 300 and 310 of FIG. 10, and it may be understood that transmitting of the treatment plan to the internal dental hospital terminal of the examinee is to reduce the time required for the orthodontic treatment diagnosis and the orthodontic treatment plan by performing the orthodontic treatment based on the treatment plan in the internal dental hospital of the examinee, thereby increasing diagnosis efficiency and reducing the quality gap due to the difference in the results of the orthodontic treatment for each dental hospital.

Meanwhile, it is preferable that the above-mentioned orthodontic treatment plan is transmitted to a terminal of a company for manufacturing the orthodontic treatment, preferably, after confirming the internal dental clinic, and more preferably, considering the number of visits to the hospital or a period of the treatment plan in the treatment plan of the examinee, the company for manufacturing the orthodontic treatment is requested to manufacture the orthodontic treatment by the time, so that the manufacture of the orthodontic treatment is performed in a timely manner, thereby achieving an efficient purpose of the orthodontic treatment.

Next, referring to FIG. 11, FIG. 11 shows a configuration diagram of an apparatus for recommending an orthodontic treatment plan by separating a tooth object from a three-dimensional oral scan data and automatically determining a positional abnormality of a tooth according to one embodiment of the present invention, and in the following description, a description of unnecessary embodiments overlapping with the descriptions of FIGS. 1 to 7 will be omitted.

As shown in FIG. 11, the present invention includes, as a main component of the above-described apparatus 10, an initial contact point search unit 11 which gradually increases a size of a circle from a center of simple coordinates of three-dimensional oral scan data 1, which corresponds to oral state information of an examinee before treatment, to search for an initial contact point at which the circle makes contact with an object included in the three-dimensional oral scan data 1.

In this case, it may be understood that the initial contact search unit 11 can perform all the functions performed in step S10 of FIG. 1 as a result, and in the present invention, a position of the tooth object may be specified in the three-dimensional oral scan data 1 by performing the functions of the initial contact search unit 11 described above.

In addition, the present invention includes, as a main component of the above-described apparatus 10, a sphere arrangement unit 12 which, after one or more spheres spread into the tooth at preset intervals from the initial contact point searched in the initial contact point search unit 11, reverses a vector direction of a mesh, duplicates the spheres while moving the spheres at a random speed in a peripheral direction from reference coordinates, and uniformly arranges the spheres inside the tooth.

That is, it may be understood that the above-described sphere arrangement unit 12 may perform all the functions performed in step S20 of FIG. 1, and in the present invention, a method for spreading, by the sphere arrangement unit 12, a plurality of small spheres having a size of 1 to 5 units inside the tooth to derive a feature point of an individual tooth is used, so that it is possible to extract physical characteristics of the tooth in a method different from the conventional method of extracting a feature point of tooth based on an appearance of the tooth.

In addition, the present invention includes, as a main component of the above-described apparatus 10, a feature data extraction unit 13 which determines a representative sphere corresponding to each tooth by increasing sizes of the spheres, which are duplicated in the sphere arrangement unit 12 to a preset size, and extracts feature data about the tooth based on a contact point and coordinates of the determined representative sphere.

That is, it may be understood that the above-described feature data extraction unit 13 may perform all the functions performed in step S30 of FIG. 1, and in the present invention, it is possible to extract tooth feature data based on detection of coordinate system data to which physical characteristics of the tooth are applied, unlike the method in which the tooth feature data is extracted based on an appearance of the conventional tooth by performing the function of the feature data extraction unit 13, thereby proposing a new approach to the extraction of the tooth feature data.

In this case, it is preferable that the feature data about the tooth extracted by the above-described feature data extraction unit 13 is stored and managed in a dedicated database 30, and the present invention is not limited thereto.

In addition, the present invention includes, as a main component of the above-described apparatus 10, an image processing unit 14 which implements, as a three-dimensional image, an examinee's tooth arrangement in which teeth are individually separated by using feature data extracted for each tooth and axis data for each tooth to acquire mesh information about an individual tooth.

That is, it may be understood that the image processing unit 14 may perform all the functions performed in step S40 of FIG. 1, and in the present invention, the image processing unit 14 may perform the above-described functions to design the movable path of the individual tooth, and an image processing technology that visualizes and shows the movable path to an external terminal 20 may be algorithmized.

In addition, the present invention includes, as a main component of the above-described apparatus 10, a positional abnormality classification unit 15 which applies a relative arrangement state of tooth objects included in tooth arrangement data, which is generated in the image processing unit, to an automatic diagnosis algorithm, to automatically classify a plurality of positional abnormalities including at least a form of malocclusion.

In this case, the position abnormality classification unit may be understood to perform all functions performed in step S50 of FIG. 1, and in the present invention, by performing the function of the position abnormality classification unit 15, it is possible to very accurately determine whether the position abnormality exists in the tooth data about the examinee according to a determination basis of the malocclusion, thereby making it possible to establish an efficient and clear treatment solution at the time of subsequent diagnosis.

In addition, the present invention includes, as a main component of the above-described apparatus 10, an orthodontic data generation unit 16 which combines classification results for an image of each tooth, data about each tooth, identification information about each tooth, and a positional abnormality for each tooth, to generate oral state information about the examinee before treatment, according to a result of performing a function of the positional abnormality classification unit.

As a result, it may be understood that the above-described orthodontic data generation unit may perform all the functions performed in step S60 of FIG. 1, and in the present invention, the automatic treatment simulation or treatment plan may be easily established by performing the functions of the orthodontic data generation unit 16.

In addition, as shown in FIG. 11, the present invention may further include, as a main component of the above-described apparatus 10, a pre-treatment oral state information loading unit 17 which loads the oral state information before treatment, which is generated using a result of performing the orthodontic data generation unit 16.

In this case, the above-described pre-treatment oral state information loading unit performs a function of loading the oral state information about the examinee before treatment in a first program (for example, a unity simulation program) which is a simulation program to which a physical engine is applied.

In the present invention, the above-described pre-treatment oral state information loading unit 17 performs the function to implement a tooth arrangement structure corresponding to the oral state information about the examinee before treatment as a three-dimensional image, and in particular, in the present invention, unlike the conventional manual separation of the individual tooth from the three-dimensional oral scan data by specialists, the three-dimensional image is implemented to separate the individual tooth with high accuracy from the three-dimensional oral scan data about the examinee using feature point data about the individual tooth and axis data about the individual tooth, thereby increasing the convenience and efficiency in establishing the orthodontic treatment plan.

In addition, as shown in FIG. 11, the present invention may include, as a main component of the above-described apparatus 10, a predicted tooth arrangement model deriving unit 18 which derives an optimal predicted tooth arrangement model from a database 31 in which one or more target predicted tooth arrangement models are stored by an algorithm pre-learned with learning data about tooth arrangement, in consideration of a predicted movement direction and a predicted moving amount of the individual tooth included in the oral state information about the examinee before treatment.

That is, according to the present invention, it is possible to derive a predicted tooth arrangement model close to the most ideal tooth model in consideration of the oral state information about the examinee before treatment by performing the function of the above-described predicted tooth arrangement model deriving unit 18.

In addition, as shown in FIG. 11, the present invention may include, as a main component of the above-described apparatus 10, an orthodontic treatment plan presentation unit 19 which selects an orthodontic solution for implementing the predicted tooth arrangement models, subdivides an orthodontic treatment plan for each step, and presents the subdivided orthodontic treatment plan.

That is, in the present invention, the above-described orthodontic treatment plan presentation unit 19 performs a function to present a plurality of orthodontic treatment plans by searching for a Pareto optimal solution while satisfying conflicting factors such as a period of orthodontic treatment, orthodontic force, and difficulty of orthodontic treatment, and a function to calculate an optimal orthodontic treatment plan for the oral state information about the examinee before treatment from the plurality of orthodontic treatment plans by using a candidate algorithm including at least one of an artificial neural network (ANN), a random forest (RF), a support vector machine (SVM), and an evolving deep network (EDN).

In addition, as shown in FIG. 11, the present invention may further include, as a main component of the above-described apparatus 10, a feedback collection unit which collects a feedback for the presented orthodontic treatment plan by selecting one or more specialists matching the oral state information about the examinee before treatment from a specialist pool in which a plurality of specialists engaged in an orthodontic treatment field are registered.

That is, in the present invention, by performing the function of the feedback collection unit 20 described above, it is possible to exhibit an effect of presenting an advanced treatment plan based on a plurality of clinical experiences by objective quantitative application diagnosis of artificial intelligence based on machine learning and big data and establishment of the treatment plan.

While the embodiments have been described with reference to limited examples and drawings as described above, it will be apparent to one of ordinary skill in the art that various changes and modifications may be made from the above description.

Next, referring to FIG. 12, FIG. 12 is a view showing an example of an internal configuration of the computing device according to one embodiment of the present invention. In the following description, redundant descriptions of the embodiment corresponding to the above descriptions for FIGS. 1 to 11 will be omitted.

As shown in FIG. 12, a computing device 10000 may at least include at least one processor 11100, a memory 11200, a peripheral interface 11300, an input/output (I/O) subsystem 11400, a power circuit 11500, and a communication circuit 11600. In this case, the computing device 10000 may correspond to a user terminal A connected to a tactile interface device or correspond to the above-described computing device B.

The memory 11200 may include, for example, a high-speed random access memory, a magnetic disk, an SRAM, a DRAM, a ROM, a flash memory, or a non-volatile memory. The memory 11200 may include a software module, an instruction set, or other various data necessary for the operation of the computing device 10000.

In this case, access to the memory 11200 from other components of the processor 11100 or the peripheral interface 11300, may be controlled by the processor 11100.

The peripheral interface 11300 may combine an input and/or output peripheral device of the computing device 10000 to the processor 11100 and the memory 11200. The processor 11100 may execute the software module or the instruction set stored in the memory 11200, thereby performing various functions for the computing device 10000 and processing data.

The input/output subsystem 11400 may combine various input/output peripheral devices to the peripheral interface 11300. For example, the input/output subsystem 11400 may include a controller for combining the peripheral device such as monitor, keyboard, mouse, printer, or a touch screen or sensor, if needed, to the peripheral interface 11300. According to another aspect, the input/output peripheral devices may be combined to the peripheral interface 11300 without passing through the input/output subsystem 11400.

The power circuit 11500 may provide power to all or a portion of the components of the terminal. For example, the power circuit 11500 may include a power failure detection circuit, a power converter or inverter, a power status indicator, a power failure detection circuit, a power converter or inverter, a power status indicator, or arbitrary other components for generating, managing, or distributing power.

The communication circuit 11600 may use at least one external port to enable communication with other computing devices.

Alternatively, as described above, the communication circuit 11600 may include an RF circuit, if needed, to transmit and receive an RF signal, also known as an electromagnetic signal, thereby enabling communication with other computing devices.

The above embodiment of FIG. 12 is merely one example of the computing device 10000, and the computing device 10000 may have a configuration or arrangement that omits some of the components shown in FIG. 12, further includes an additional component that is not shown in FIG. 12, or combines at least two components. For example, a computing device for a communication terminal in a mobile environment may further include a touch screen, a sensor, or the like, in addition to the components shown in FIG. 12. The communication circuit 11600 may include a circuit for RF communication of various communication schemes (such as WiFi, 3G, LTE, Bluetooth, NFC, and Zigbee). The components that may be included in the computing device 10000 may be implemented by hardware, software, or a combination of both hardware and software which include at least one integrated circuit specialized in a signal processing or an application.

The methods according to the embodiments of the present invention may be implemented in the form of program instructions to be executed through various computing devices so as to be recorded in a computer-readable medium. In particular, a program according to the embodiment of the present invention may be configured as a PC-based program or an application dedicated to a mobile terminal. The application to which the present invention is applied may be installed in a user terminal through a file provided by a file distribution system. For example, a file distribution system may include a file transmission unit (not shown) that transmits the file according to the request of the user terminal.

The above-described device may be implemented by hardware components, software components, and/or a combination of hardware components and software components. For example, the devices and components described in the embodiments may be implemented by using at least one general purpose computer or special purpose computer such as a processor, a controller, an arithmetic logic unit (ALU), a digital signal processor, a microcomputer, a field programmable gate array (FPGA), a programmable logic unit (PLU), a microprocessor, or any other device capable of executing and responding to instructions. The processing device may execute an operating system (OS) and at least one software application executed on the operating system.

In addition, the processing device may access, store, manipulate, process, and create data in response to the execution of the software. For the further understanding, in some cases, one processing device may be used, however, those skilled in the art will be appreciated that the processing device may include a plurality of processing elements and/or a plurality of types of processing elements. For example, the processing device may include a plurality of processors or one processor and one controller. In addition, other processing configurations, such as a parallel processor, are also possible.

The software may include a computer program, a code, an instruction, or a combination of at least one thereof, may configure the processing device to operate as desired, or may instruct the processing device independently or collectively. In order to be interpreted by the processor or to provide instructions or data to the processor, the software and/or data may be permanently or temporarily embodied in any type of machine, component, physical device, virtual equipment, and computer storage medium or device. The software may be distributed over computing devices connected to networks, so as to be stored or executed in a distributed manner. The software and data may be stored in at least one computer-readable recording medium.

The above-described embodiments of the present invention may be recorded in computer-readable media including program instructions to implement various operations embodied by a computer. The computer-readable medium may also include, alone or in combination with the program instructions, data files, data structures, and the like. The program instructions recorded on the media may be those specially designed and constructed for the purposes of the embodiments, or they may be of the kind well-known and available to those having skill in the computer software arts. Examples of computer-readable recording media include magnetic media such as hard disks, floppy disks, and magnetic tape; optical media such as CD ROM disks and DVDs; magneto-optical media such as optical discs; and hardware devices that are specially configured to store and perform program instructions, such as read-only memory (ROM), random access memory (RAM), flash memory, and the like. Examples of program instructions include both machine code, such as produced by a compiler, and files containing higher level code that may be executed by the computer using an interpreter. The described hardware devices may be configured to act as one or more software modules in order to perform the operations of the above-described embodiments of the present invention, or vice versa.

While the embodiments have been described with reference to limited examples and drawings as described above, it will be apparent to one of ordinary skill in the art that various changes and modifications may be made from the above description. Suitable results may be achieved if the described techniques are performed in a different order, and/or if components in a described system, architecture, device, or circuit are combined in a different manner, and/or replaced or supplemented by other components or their equivalents. Therefore, other implementations, other embodiments, and equivalents of the claims are within the scope of the following claims.

The invention claimed is:

1. A method for recommending an orthodontic treatment plan by separating a tooth object from a three-dimensional oral scan data and automatically determining a positional abnormality of a tooth, which is implemented by a computing device including one or more processors and a main memory for storing instructions executable in the processors, the method comprising:

an initial contact point search step of gradually increasing a size of a circle from a center of simple coordinates of the three-dimensional oral scan data, which corresponds to oral state information about an examinee before treatment, to search for an initial contact point at which the circle makes contact with an object included in the three-dimensional oral scan data;

a sphere arrangement step of, after spreading one or more spheres into the tooth at preset intervals from the searched initial contact point, reversing a vector direction of a mesh, duplicating the spheres at a preset period while moving the spheres at a random speed in a peripheral direction from reference coordinates, and uniformly arranging the spheres inside the tooth;

a feature data extraction step of determining a representative sphere corresponding to each tooth by increasing sizes of the spheres, which are duplicated in the sphere arrangement step, to a preset size, and extracting feature data about the tooth based on a contact point and coordinates of the determined representative sphere;

an image processing step of implementing, as a three-dimensional image, an examinee's tooth arrangement in which teeth are individually separated by using feature data extracted for each tooth and axis data for each tooth to acquire mesh information about an individual tooth;

a positional abnormality classification step of applying a relative arrangement state of tooth objects included in tooth arrangement data, which is generated in the image processing step, to an automatic diagnosis algorithm, to automatically classify a plurality of positional abnormalities including at least a form of malocclusion; and an orthodontic data generation step of combining classification results for an image of each tooth, data about each tooth, identification information about each tooth, and a positional abnormality for each tooth, to generate oral state information about the examinee before treatment, according to a result of performing the positional abnormality classification step.

2. The method of claim 1, wherein in the image processing step, the axis data for each tooth is extracted based on a volume center point and a width center point of the three-dimensional scan data, and axis data for each tooth obtained parallel to a root of the tooth is extracted by applying a numerical correction value, which is derived through statistical analysis, to a line passing through the volume center point and the width center point.

3. The method of claim 1, wherein the determination of the representative sphere is performed until representative spheres corresponding to a number of teeth of the examinee is obtained by determining a representative sphere corresponding to a center point of each tooth by increasing the size of the duplicated sphere to a preset size to remove a sphere that falls outside the tooth, and reducing a sphere remaining inside the tooth to the preset size.

4. The method of claim 1, wherein the image processing step includes converting the mesh information of the individual tooth into a preset file format compatible in a first program that handles motion data to export the mesh information, and storing work data in the first program as a script file.

5. The method of claim 1, wherein the feature data extracting step includes:

extracting, as feature data of a representative sphere corresponding to one individual tooth, x, y, and z coordinate values for a position in a three-dimensional space, x, y, and z coordinate values for rotation, and x, y, and z coordinate values for scale.

6. The method of claim 1, wherein when the sphere arrangement step is performed, a size of the spheres spread into the tooth is in a range of 1 to 5 units, in which one unit corresponds to 1/10,000 mm.

7. The method of claim 1, wherein the positional abnormality classification step includes determining, based on the size of the tooth and the relative arrangement state, for each malocclusion as crowding when contact points between the teeth do not meet each other and intersect, spacing when a space exists between the contact points between the teeth, rotation when the teeth are rotated together, openbite & deepbite when a vertical relationship of the teeth does not coincide with a preset first numerical value, tilt of a mesiodistal tooth axis when an inclination of the tilt of the mesiodistal tooth axis of the tooth does not coincide with a preset second numerical value, tilt of buccolingual tooth axis when an inclination of the tilt of buccolingual tooth axis of the tooth does not coincide with a preset third numerical value, and engagement when cusps of maxillary teeth are not located between two mandibular teeth.

8. The method of claim 7, wherein the positional abnormality classification step includes determining a degree of detail based on a scale of numerical values, which serve as a determination basis for each malocclusion, to set the degree of detail together with malocclusion classification information.

9. The method of claim 1, wherein the orthodontic data generation step includes generating data, which is obtained by converting mesh information of a tooth image derived from the three-dimensional oral scan data, into an object format simulated in a first program, together with the oral state information before treatment.

10. The method of claim 1, further comprising, after the orthodontic data generation step:

a pre-treatment oral state information loading step of loading the oral state information before treatment, which is generated using a result of performing the orthodontic data generation step;

a predicted tooth arrangement model deriving step of deriving one or more target predicted tooth arrangement models by an algorithm pre-learned with learning data about tooth arrangement, in consideration of a predicted movement direction and a predicted moving amount of the individual tooth included in the oral state information about the examinee before treatment;

an orthodontic treatment plan presentation step of selecting an orthodontic solution for implementing the predicted tooth arrangement models, subdividing an orthodontic treatment plan for each step, and presenting the subdivided orthodontic treatment plan; and a feedback collection step of collecting a feedback for the presented orthodontic treatment plan by selecting one or more specialists matching the oral state information about the examinee before treatment from a specialist pool in which a plurality of specialists engaged in an orthodontic treatment field are registered.

11. The method of claim 10, wherein in the orthodontic treatment plan presentation step, a predicted value of an element including at least one of a period of orthodontic treatment, orthodontic force, and difficulty of the orthodontic treatment according to a current tooth state of the examinee is used as an objective function, a plurality of orthodontic treatment plans are presented by searching for a Pareto optimal solution that allows a value of the objective function to be minimized while satisfying the objective function using a Pareto optimal solution calculation technique, and when the plurality of orthodontic treatment plans are derived through the Pareto optimal solution calculation technique, an optimal orthodontic treatment plan for the oral state information about the examinee before treatment is calculated from the plurality of orthodontic treatment plans by using a candidate algorithm including at least one of an artificial neural network (ANN), a random forest (RF), a support vector machine (SVM), and an evolving deep network (EDN).

12. The method of claim 11, wherein when the pre-treatment oral state information loading step is performed, image data including at least one of an X-ray image, an intraoral image, and a facial image for the oral state information about the examinee before treatment are further collected as reference data, and the reference data is used only as a condition variable of the candidate algorithm.

13. The method of claim 11, wherein in the orthodontic treatment plan presenting step, a time series tooth movement path for implementing the predicted tooth arrangement model from the oral state information about the examinee before treatment is processed and provided as a visualization model, based on the calculated optimal orthodontic treatment plan.

14. The method of claim 10, wherein when the feedback collection step is performed, the selection of the specialist is performed by selecting a specialist whose clinical experience corresponding to the oral state information about the examinee before treatment is determined to be equal to or greater than a preset threshold reference, and in the feedback collection step, supervised learning is performed on the algorithm by labeling the feedback collected by the one or more specialists.

15. An apparatus for recommending an orthodontic treatment plan by separating a tooth object from a three-dimensional oral scan data and automatically determining a positional abnormality of a tooth, which is implemented by a computing device including one or more processors and a main memory for storing instructions executable in the processors, the apparatus comprising:

an initial contact point search unit which gradually increases a size of a circle from a center of simple coordinates of the three-dimensional oral scan data, which corresponds to oral state information about an examinee before treatment, to search for an initial contact point at which the circle makes contact with an object included in the three-dimensional oral scan data;

a sphere arrangement unit which, after one or more spheres spread into the tooth at preset intervals from the searched initial contact point, reverses a vector direction of a mesh, duplicates the spheres while moving the spheres at a random speed in a peripheral direction from reference coordinates, and uniformly arranges the spheres inside the tooth;

a feature data extraction unit which determines a representative sphere corresponding to each tooth by increasing sizes of the spheres, which are duplicated in the sphere arrangement unit, to a preset size, and extracts feature data about the tooth based on a contact point and coordinates of the determined representative sphere;

an image processing unit which implements, as a three-dimensional image, an examinee's tooth arrangement in which teeth are individually separated by using feature data extracted for each tooth and axis data for each tooth to acquire mesh information about an individual tooth;

a positional abnormality classification unit which applies a relative arrangement state of tooth objects included in tooth arrangement data, which is generated in the image processing unit, to an automatic diagnosis algorithm, to automatically classify a plurality of positional abnormalities including at least a form of malocclusion; and an orthodontic data generation unit which combines classification results for an image of each tooth, data about each tooth, identification information about each tooth, and a positional abnormality for each tooth, to generate oral state information about the examinee before treatment, according to a result of performing a function of the positional abnormality classification unit.

16. A non-transitory computer-readable recording medium that stores instructions for allowing a computing device to perform the following steps, wherein the steps comprise:

an initial contact point search step of gradually increasing a size of a circle from a center of simple coordinates of the three-dimensional oral scan data, which corresponds to oral state information about an examinee before treatment, to search for an initial contact point at which the circle makes contact with an object included in the three-dimensional oral scan data;

a sphere arrangement step of, after spreading one or more spheres into the tooth at preset intervals from the searched initial contact point, reversing a vector direction of a mesh, duplicating the spheres at a preset period while moving the spheres at a random speed in a peripheral direction from reference coordinates, and uniformly arranging the spheres inside the tooth;

a feature data extraction step of determining a representative sphere corresponding to each tooth by increasing sizes of the spheres, which are duplicated in the sphere arrangement step, to a preset size, and extracting feature data about the tooth based on a contact point and coordinates of the determined representative sphere;

an image processing step of implementing, as a three-dimensional image, an examinee's tooth arrangement in which teeth are individually separated by using feature data extracted for each tooth and axis data for each tooth to acquire mesh information about an individual tooth;

a positional abnormality classification step of applying a relative arrangement state of tooth objects included in tooth arrangement data, which is generated in the image processing step, to an automatic diagnosis algorithm, to automatically classify a plurality of positional abnormalities including at least a form of malocclusion; and an orthodontic data generation step of combining classification results for an image of each tooth, data about each tooth, identification information about each tooth, and a positional abnormality for each tooth, to generate oral state information about the examinee before treatment, according to a result of performing the positional abnormality classification step.

\* \* \* \* \*